United States Patent
Stumpf et al.

(10) Patent No.: US 10,441,997 B2
(45) Date of Patent: Oct. 15, 2019

(54) CASTING MOLD, INSERT FOR A CASTING MOLD, A CAST PART AND A CASTING METHOD THEREFOR

(71) Applicants: BÖLLHOFF VERBINDUNGSTECHNIK GmbH, Bielefeld (DE); Fraunhofer-Gesellschaft zur Förderung der angewandten Forschung e.V., München (DE)

(72) Inventors: Michael Stumpf, Bielefeld (DE); Francisco Tovar, Bielefeld (DE); Marco Haesche, Osterholz-Scharmbeck (DE); Franz-Josef Wöstmann, Münster (DE); Christoph Pille, Bremen (DE); Michael Heuser, Bremen (DE); Tobias Beyer, Paderborn (DE)

(73) Assignees: Böllhoff Verbindungstechnik GmbH, Bielefeld (DE); Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 306 days.

(21) Appl. No.: 15/300,832

(22) PCT Filed: Mar. 31, 2015

(86) PCT No.: PCT/EP2015/056956
§ 371 (c)(1),
(2) Date: Sep. 30, 2016

(87) PCT Pub. No.: WO2015/150356
PCT Pub. Date: Oct. 8, 2015

(65) Prior Publication Data
US 2017/0021410 A1    Jan. 26, 2017

(30) Foreign Application Priority Data

Mar. 31, 2014 (DE) .................. 10 2014 206 088
Nov. 10, 2014 (DE) .................. 10 2014 222 908

(51) Int. Cl.
B22D 17/22    (2006.01)
B22D 17/24    (2006.01)
(Continued)

(52) U.S. Cl.
CPC .......... B22D 17/2227 (2013.01); B22C 9/101 (2013.01); B22C 9/108 (2013.01);
(Continued)

(58) Field of Classification Search
CPC .......... B22C 9/10; B22C 9/101; B22C 9/108; B22C 9/22; B22D 17/22; B22D 17/2227;
(Continued)

(56) References Cited

U.S. PATENT DOCUMENTS 2,480,966 A    9/1949   Richardson et al.
2,672,070 A    3/1954   Forster
(Continued)

FOREIGN PATENT DOCUMENTS

CH        251484 A      10/1947
CN     101850416 A      10/2010
(Continued)

OTHER PUBLICATIONS

CN Office Action for CN Application No. 201580018231.8 dated Aug. 28, 2018 (16 pages).
(Continued)

*Primary Examiner* — Kevin P Kerns
(74) *Attorney, Agent, or Firm* — Reising Ethington P.C.

(57) ABSTRACT

A metal casting method and a plastic injection molding method in which an insert is molded in molten material such that no molten material enters the interior of the insert. The usage of a wire thread insert as insert has the advantage that for example in an aluminum cast part thread holes can be produced already as part of the casting process. For this
(Continued)

Figure 1:
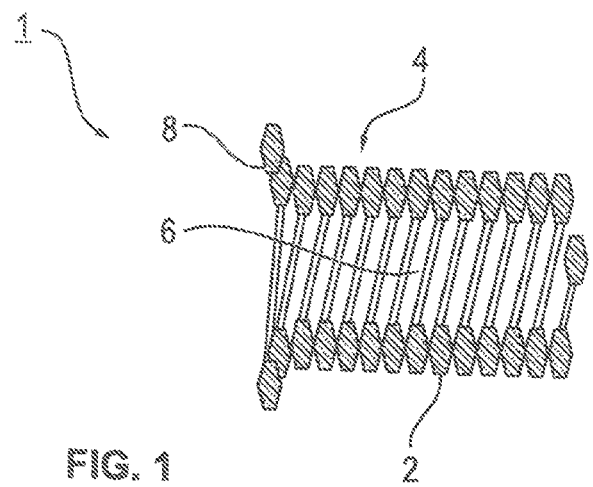

purpose, the casting mold, the insert, as well as the casting method are described.

32 Claims, 17 Drawing Sheets

(51) Int. Cl.
  B22D 19/00    (2006.01)
  B22D 19/04    (2006.01)
  B22D 19/06    (2006.01)
  B22C 9/10     (2006.01)
  B22C 9/22     (2006.01)
  B29C 45/14    (2006.01)
  B29L 1/00     (2006.01)
  F16B 37/04    (2006.01)
  F16B 37/12    (2006.01)

(52) U.S. Cl.
  CPC ............... *B22C 9/22* (2013.01); *B22D 17/24* (2013.01); *B22D 19/00* (2013.01); *B22D 19/0081* (2013.01); *B22D 19/04* (2013.01); *B22D 19/06* (2013.01); *B29C 45/14065* (2013.01); *B29C 45/14418* (2013.01); *B29L 2001/00* (2013.01); *F16B 37/048* (2013.01); *F16B 37/12* (2013.01)

(58) Field of Classification Search
  CPC .... B22D 17/24; B22D 19/00; B22D 19/0081; B22D 19/04; B22D 19/06
  USPC ................................ 164/112, 131, 137, 369
  See application file for complete search history.

(56) References Cited

U.S. PATENT DOCUMENTS

| | | |
|---|---|---|
| 3,112,540 A | 12/1963 | Kaneko et al. |
| 3,525,365 A | 8/1970 | Meulendyk |
| 3,945,070 A | 3/1976 | Hauser |
| 4,788,022 A | 11/1988 | Sakayori et al. |
| 8,069,901 B2 | 12/2011 | Nishikawa |
| 8,931,991 B2 | 1/2015 | Grubert et al. |
| 9,038,271 B2 | 5/2015 | Huang et al. |
| 2008/0166204 A1 | 7/2008 | Nilsen |
| 2010/0297284 A1 | 11/2010 | Shibata et al. |
| 2015/0014466 A1 | 1/2015 | Grubert et al. |
| 2015/0014884 A1 | 1/2015 | Grubert et al. |
| 2015/0314506 A1 | 11/2015 | Stumpf et al. |

FOREIGN PATENT DOCUMENTS

| | | |
|---|---|---|
| CN | 101855034 A | 10/2010 |
| CN | 105143690 A | 12/2015 |
| DE | 1927755 A1 | 12/1970 |
| DE | 4137805 A1 | 5/1993 |
| DE | 19514400 C1 | 8/1996 |
| DE | 19724880 A1 | 8/1998 |
| DE | 19831940 A1 | 1/2000 |
| DE | 10357647 A1 | 7/2005 |
| DE | 102009048160 A1 | 4/2011 |
| DE | 102012019849 A1 | 4/2014 |
| DE | 102013100747 A1 | 7/2014 |
| EP | 1046446 B1 | 3/2003 |
| EP | 2168750 A1 | 3/2010 |
| GB | 610869 A | 10/1948 |
| GB | 2261398 A | 5/1993 |
| JP | H01275953 A | 11/1989 |
| JP | H0671691 A | 3/1994 |
| JP | 2013221621 A | 10/2013 |
| WO | WO9725172 A1 | 7/1997 |
| WO | WO2014057027 A1 | 4/2014 |

OTHER PUBLICATIONS

Written Opinion & International Search Report for PCT/EP2015/056956 dated Jun. 29, 2015, 10 pages.

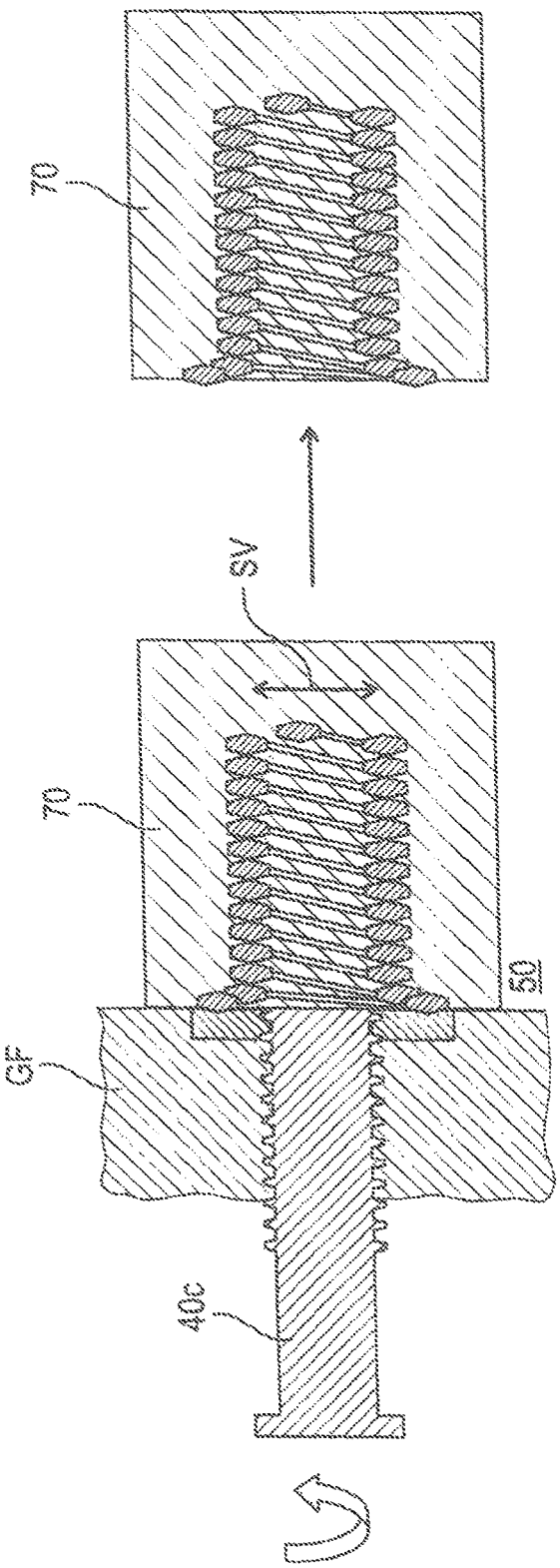

CASTING MOLD, INSERT FOR A CASTING MOLD, A CAST PART AND A CASTING METHOD THEREFOR

1. TECHNICAL FIELD

The present disclosure relates to a metal casting mold and a plastic injection casting mold, an insert which is moldable into a metal casting part or an injection molded plastic part, a casting preparation method for the preparation of the manufacturing of the metal casting part or injection molded plastic part, a metal casting method and a plastic injection molding method as well as a cast part produced therewith.

2. BACKGROUND

Molten metals and plastics which are used for casting components have in the temperature range of the molten state a very low viscosity. This characteristic results in that even smallest gaps and cavities, for example in an insert or in a casting mold, are infiltrated at the casting of these molten materials. This is especially the case at pressure-supported casting methods such as, for example, at the aluminum die-casting or at injection molding methods for plastics. During the molding or over molding of inserts, such as threaded inserts, with molten metal or with liquid plastics, the risk is thus that the liquid materials are infiltrated in the insert, for example the thread of the above-mentioned threaded insert, and thereby affect the later function of the insert. For subsequently introducing inner threads at cast components, for example of metal or plastic, there is generally the possibility that the inner threads are included in a subsequent process step by cutting production methods. At the subsequent including of the thread into the cast material, it may come to the exposure of porosities being present in the cast material, which weaken the strength of the thread and lead to defective work.

A possibility for creating inner threads during the casting processes is the usage of so-called collapsible cores. This technique comes from the plastic injection molding and could be transferred to the die-casting of zinc. The collapsible cores have the structure to be reproduced radially on the core surface. By a segmentation of the core, it is possible to "fold" the collapsible core after solidification of the molten material and to demold the component in this way.

In metal die-casting as well as in sand or permanent mold casting, inner threads may also be created by the subsequent introducing of threaded sleeves. Established are for example self-cutting threaded sleeves of annealed steel which may be screwed directly into cored bores. Also, wire thread inserts have a wide usage in which a female thread is cut into a cored bore, in which subsequently the wire thread insert may be screwed in. The advantages are a secure side or flank contact over the complete length of the thread and an increase of the strength of the complete connection by 25-30%. These advantages can be used constructively with respect to small installation depths and small thread diameters.

The molding of inserts, as for example metallic inserts, in molten metal or molten plastics is known and described under the term "material compounds" or "compound casting". In engine pistons of cast aluminum for example piston ring seats from an iron nickel alloy are molded. The molding of steel-based threaded inserts in aluminum casting has the target to achieve a higher loadability as it is provided by a thread cut into aluminum. The fit of the molded insert takes place by a form and force-fit bond which is achieved by shrinking the solidifying cast metal.

The patent document EP 1 046 446 B1 describes a casting technically produced metal cast part with directly molded gapless wound wire coil. The wire coil acts as a thread in the cast part and is freely accessible from both sides. The casting technically integration is such that a mold half of a two-part casting tool has a fixed cylindrical core pin onto which the two-sided open, gapless wire winding (similar to a spiral) with tightly fitting windings is placed. Subsequently, the mold tool is closed and a cylindrical core pin is inserted into the wire winding also from the other side. Both core pins are slightly conically widened to the end of the windings so that they slightly stretch the wire winding upon closing of the casting tool and thus ensure a tight pressing of the core pin onto the wire winding. Nevertheless, an entering of molten metal on the face side during the casting has proven to be disadvantageous as wire threads are blocked thereby.

Furthermore, with the technical solution approach described here, only a continuous, two-sided open thread can be created in a cast part. However, no threaded blind hole can be produced which is open only on one side. Furthermore, no approach is described in order to prevent in a process-reliable manner the entering of molten metal into the exposed thread of the wire thread insert, thus at the entrance and the exit of the wire thread insert.

In U.S. Pat. No. 3,945,070, a method for molding a wire thread insert into molten metal is described. During the casting method, the wire thread insert is arranged on a pin. The solidifying of the molten metal after the casting process leads to a material shrinkage which changes the thread pitch of the wire thread insert. This material change is deliberately included in the thread pitch of the wire thread insert so that after solidifying of the cast part the desired pitch of the thread results. U.S. Pat. No. 3,945,070 provides no information about how the entering of low viscous molten material can be prevented laterally and on the face side.

In U.S. Pat. No. 3,112,540, the production of a blind hole with wire thread insert in a cast part is disclosed. To this end, the wire thread insert is screwed onto a holding core with thread and is subsequently molded into the molten metal. For achieving an increased strength of the wire thread insert in the cured cast part, several threads at the closed side of the blind hole are molded into the molten metal.

In U.S. Pat. No. 2,672,070, a wire thread insert is molded into a cast part without that the liquid material of the cast part can enter the interior of the wire thread insert in a radial direction. For this purpose, the cross-section of adjacent windings are formed such that they abut each other like a labyrinth seal. Further, in the course of this labyrinth seal, a cavity is provided in which possibly infiltrated molten material can solidify. This solidified molten material blocks then additionally to the labyrinth seal the entering of the liquid material into the interior of the wire thread insert. Besides the elaborate production of such wire thread inserts, the here described solution concept is not described for metal casting methods.

DE 10 2009 048 160 A1 describes a wire thread insert for the molding into a cast part of molten metal or molten plastic having at least at an axial face side a wound flange. By means of this wire thread insert, through holes as well as blind holes are producible in a cast part. For preventing a radial entering of plastic or molten metal into the interior of the wire thread insert, adjacent windings abut each other two-dimensionally like a labyrinth seal or the radial outer side of the wire thread insert is sealed by a suitable and externally applied seal mass.

The description of the prior art shows that, especially at cast components of non-ferrous metal, the usage of thread inserts has technical advantages, primarily with respect to the mechanical loadability of the thread. To this end, methods exist for subsequently including thread inserts by means of mechanically processing the cast part (for example at the usage of wire thread inserts), the two or multi-step process of which is disadvantageous and economically elaborate. A further approach is the direct molding of thread inserts in the metal casting process. However, there are no technical descriptions for the process reliable preventing of the entering of molten metal or molten plastic in the thread of an insert during molding or over molding of the molten material.

Also, there is no indication in the prior art how the molten metal or molten plastic which is introduced with high velocity into the casting mold affects the threaded insert in the casting mold. The same applies to the consideration of material shrinkage processes during cooling of the molten material in the casting mold. If a material shrinkage within the cooling cast component should take place differently with respect to the possible spatial directions, mechanical tension states and failure states result which affect the integrity of the cast component. It is therefore disadvantageous in the prior art not to identify the possibility of such states and to take no counter measures.

A direct integration of inserts, as for example wire thread inserts, in the casting process offers economical and technical advantages, primarily due to the cost-effective manufacturing of the thread insert in the wire winding method. However, there is especially upon usage of wire thread inserts the risk that molten material cannot only infiltrate the thread via the one or two, respectively, open face sides of the thread insert but also via the individual threads merely lying tightly against each other by pressing. This aspect is primarily critical at the molding or over molding of wire thread inserts in pressure supported metal casting methods and plastic injection molding methods. A technical description of a solution for this does not exist according to the present prior art.

It is therefore the object of at least certain implementations of the present invention to provide a casting technical integration of inserts, especially of wire thread inserts, during the casting processes by means of molten metal or molten plastic, wherein a flowing of molten metal or molten plastic into the interior of the inserts is process reliably prevented. Further, it is an object of at least certain implementations of the present invention to consider shrinkage processes in the cast material and to counteract the loads resulting therefrom in the cast component.

3. SUMMARY

The above object may be solved by a metal casting method or a plastic injection molding method as well as by a cast part made of metal or plastic. Advantageous embodiments and developments of the present disclosure result from the following description, the accompanying drawings as well the claims.

The present disclosure comprises a metal casting mold, especially for a pressure supported metal casting method by means of which a cast part is producible. The metal casting mold comprises the following features: a mold cavity defined by a plurality of inner walls and defining a shape of the cast part, a positioning device for at least one insert held by at least one inner wall of the metal casting mold such that the insert is positionable within the mold cavity, wherein at or near the positioning device as well as between the at least one inner wall of the metal casting mold and the insert a preferably flexible sealing element is arranged by means of which the insert is at least partly sealable against the entering of molten metal. In a similar constructive configuration, the present disclosure comprises a plastic injection casting mold by means of which a plastic part is producible. This plastic injection casting mold comprises the following features: a mold cavity defined by a plurality of inner walls and defining a shape of the plastic part, a positioning device for at least one insert which is held by at least one inner wall of the plastic injection casting mold such that the insert is positionable within the mold cavity, wherein at or near the positioning device as well as between the at least one inner wall of the plastic injection casting mold and the insert a preferably flexible sealing element is arranged by means of which the insert is at least partly sealable against the entering of liquid plastic.

The metal casting mold as well as the plastic injection casting mold are characterized by related constructive features. Therefore, the described constructive features, for example of the metal casting mold, are transferrable in the same way to the plastic injection casting mold. The metal casting mold and the plastic injection casting mold are summarized therefore as casting mold. The casting molds are adapted to the molding of at least one insert as for example a wire thread insert. To this end, these casting molds have a positioning device that positions the at least one insert in the predefined mold cavity suitably and holds it there while a liquid material melting as for example a molten metal or a molten plastic is introduced into the mold cavity. The molten metal or the molten plastic is characterized by a low viscosity depending on the temperature range of the molten material and the material characteristics. Further, it is preferred to mold the molten materials under pressure into the casting mold. As the molten material has the characteristic to enter smallest intermediate spaces, it may be necessary in at least certain implementations to keep an inner cavity of the insert, for example an inner thread in a wire thread insert, at least partly free from this molten material. Due to the fluidity of the molten material, it enters the insert for example at the interface on the face side between the insert and an inner wall of the mold cavity of the metal casting mold. Therefore, and according to the disclosure, a sealing element is arranged between the inner wall of the metal casting mold and the insert which due to its preferred flexibility closes gaps and/or cavities at this interface and prevents in this way the entering of molten material into an interior of the insert at the face side. To this end, the flexible sealing element is qualified by its temperature and pressure resistance at least with respect to the sealing function provided, which is maintained during the casting method. Further, the sealing element is preferably removable from the cast part after the demolding of the cast part from the casting mold so that it does not negatively affect the insert and/or the cast part neither in its function nor in its construction. In the same way, it is preferred to keep the sealing element in the casting mold or at the completed cast part if thereby the further processing and/or usage of the cast part or the further usage of the casting mold is not affected.

For being able to arrange the sealing element effectively between an inner wall of the casting mold and the insert, the positioning device of the casting mold comprises a holding core which is arranged in the metal casting mold releasably or fixedly and at which the insert and the sealing element are fastenable. This holding core preferably consists of metal, plastic, ceramic or of a combination of a selection of these materials.

According to an embodiment, the sealing element is formed annularly. It surrounds the holding core onto which the insert is arranged and consists of natural or synthetic caoutchouc (rubber) or generally of one or several elastomers or plastics or of a combination of these materials.

According to an embodiment, the sealing element is an element separate from the holding core and the insert, which is arranged on the holding core. For fastening this separate sealing element, the holding core having the insert screwed or placed thereon is for example inserted in an opening in the inner wall of the mold cavity. Prior to the fastening of the holding core, the sealing element is arranged between the inner wall and the insert and is thus clamped in this position. It is also possible to arrange the insert on a holding core arranged fixed in the mold cavity. Prior to the insert being fastened on the holding core, the separate sealing element is placed on the holding core for the sealing between inner wall and insert.

According to a further embodiment, the insert comprises on the face side and adjacent to the wall of the casting mold a circumferential flexible collar which forms the sealing element. In this embodiment, the insert, for example a closely wound wire thread insert or a wire thread insert wound on block, is sealed radially outwardly in its axial cavity by a plastic coating or plastic filling. This plastic coating or plastic filling of the interior of the insert is preferably extended to a face side of the insert to form there a circumferential collar which covers the face side of the insert. It is also preferred to form the collar separately from the plastic coating or filling at the face side of the insert or wire thread insert, respectively. This collar has the same function as the also described sealing ring or sealing disc. As soon as the insert is arranged on a holding core, this circumferential collar consisting of a preferably flexible sealing material is arranged at the interface between the inner wall of the mold cavity and the insert. This construction of the insert has the advantage that the insert with sealing element is present as one unit so that not several single parts have to be positioned in the casting mold. The plastic coating or plastic filling arranged in the interior of the insert has according to an embodiment a lower flexibility or shore hardness than the collar, as thereby a sufficient inner sealing can be ensured. In this case, the insert is formed by a combination of plastics with plastics of different flexibility at the collar and in the interior of the insert. It is also preferred to form the collar and the plastic coating of the insert from only one plastic. In this case, preferably the contact pressure between insert and inner wall of the mold and/or the construction of the inner wall of the mold in the adjacent portion between the inner wall of the mold and insert is adapted to the material characteristics of the plastic, for example its flexibility or shore hardness.

As it has been mentioned already above, it is preferred to form the at least one holding core arranged in the casting mold at least partly conically or cylindrically shaped. According to a further embodiment, the at least one holding core comprises an outer thread. In a further embodiment of the holding core, it is formed by a cylindrically formed pin protruding into the mold cavity and movable along a longitudinal axis of the holding core out of the mold cavity, preferably slidable. In a further embodiment, the holding core formed as cylindrically shaped pin comprises a thread wherein it also protrudes into the mold cavity and is movable along its longitudinal axis out of the mold cavity, preferably it can be screwed out. In the above embodiments, the holding core is moved out of the mold cavity such that its length protruding into the mold cavity is successively decreased until it does not protrude anymore into the mold cavity. As has been explained above already, the holding cores for fastening the insert in the mold cavity are formed differently. If the thread insert as insert is placed on the holding core, this is in the same way possible by placing it on an especially cylindrically shaped pin having no thread as well as by screwing it onto an especially cylindrically formed pin with thread. These different constructive holding cores give the insert sufficient stability and position security while the molten material is introduced into the mold cavity. During the subsequent cooling of the molten material, shrinkage processes occur in the cast part which may be distributed isotropically as well as anisotropically in the cast part. For counteracting critical mechanical tension states due to the shrinkage processes in the cast part, the holding cores are removable from the mold cavity and thus from the interior of the insert despite their different construction already during the cooling process and preferably prior to the demolding of the cast part. For this purpose, the respectively used holding core is moved out of the insert. This movement takes place preferably by a displacing of the holding core in its axial longitudinal direction. Accordingly, the holding core is preferably pulled out of the insert or if a thread on the holding core is present it is screwed out of the insert and the mold cavity. Further, the holding core is moved independently from its configuration through an opening in the wall of the casting mold from the outside into the mold cavity. There, it is preferably fixed by locking in the wall of the casting mold to hold the insert located on the holding core position-accurately. Alternatively, the holding core is placed or screwed in an opening provided therefor in the inner wall of the mold cavity from the inside of the mold cavity and fixed there.

Further preferred, the holding core may remain in the mold cavity until the cast part has been demolded completely. At this procedure, the longitudinal axis of the holding core in the mold cavity has to be aligned at the opening of the mold cavity parallel to the movement direction of the molding halves or the mold parts to guarantee a trouble-free opening of the mold. In the same way, the longitudinal axis of the holding core has to be arranged parallel to the removal direction of the cast part.

It is further preferred to arrange the holding core regardless of the configuration of the holding core such that it is movable out of the mold cavity through the surrounding wall of the mold cavity. This movement occurs preferably by pulling or rotating the holding core. On this basis, any holding core of any configuration is removable from the mold cavity and the cast part located there already prior to the demolding of the cast part. This has the advantage that a holding core does not hinder shrinkage processes in the material of the cast part. A further advantage is that the mold halves or mold parts of the casting mold can be moved in arbitrary directions for demolding the cast part without that a coordination with the orientation of the longitudinal axis of the holding core in the cast part is required. From this it follows that inserts can be arranged in arbitrary spatial orientation in the mold cavity and in the cast part by means of a holding core being removable from the mold cavity prior to the demolding of the cast part, because the holding core has already been removed from the cast part and the mold cavity for demolding the cast part from the mold cavity.

According to a further embodiment, the holding core is a cylindrically shaped pin of plastic, wherein the plastic has an approximately heat-independent strength. The material choice of the holding core of plastic adapted preferably to the casting process and the heat amounts being present there preferably ensure that the holding core maintains its stability despite a heating up to almost the melting temperature of the cast material. This guarantees that the holding core of plastic holds the insert position accurately in the mold cavity.

According to a further embodiment, the holding core for the insert is a cylindrically shaped pin of plastic, wherein the plastic has a heat-dependent strength which decreases with increasing thermal load.

Referring to the here-described preferred material choice of the holding core of plastic, it is considered that shrinkage processes take place during the cooling of the cast component in the mold cavity. These may lead to deformation processes which counteract the rigid positioning of an insert on a holding core in the mold cavity. For ensuring here compensating or mechanical relieving movement possibilities of the insert on the holding core in an acceptable tolerance range in comparison to the occurring shrinkage processes, the plastic of the holding core is provided at increasing heat with an increased movability or flexibility or reduced strength compared to a strength at room temperature. On the basis of this material choice, the holding core and thus, in specific limits, the insert follows the shrinkage processes taking place in the material without that failure relevant mechanical tension conditions are created in the cast component thereby in that the holding core remains rigidly in its position in the mold cavity. With this material choice of the holding core of plastic, it is, however, at the same time ensured that despite a reduced strength of the plastic due to the heating of the holding core in the newly casted cast component, a position-stable mounting of the insert in the cast component and in the mold cavity takes place.

According to a further embodiment, the holding core comprises at least one pre-determined breaking point which ensures a failure of the holding core transverse to a longitudinal direction of the holding core. The here-described preferred construction of the holding core considers also shrinkage processes taking place in the cooling cast material so that failure relevant mechanical tension conditions in the cast component are avoided. Among failure-relevant mechanical tension conditions are all mechanical tension conditions understood which can deform, damage or even destroy the cast component itself as well as an insert arranged in the cast component. As has been already explained above with respect to the shrinkage processes, they may lead to a position change of the insert with respect to the position of the holding core within the mold cavity. For providing for these shrinkage processes a sufficient freedom of movability to the insert, the holding core may be provided with a predetermined breaking point. If, thus, shrinkage processes take place which load the holding core inclined or transverse to its longitudinal axis, then the holding core fails at the predetermined breaking point as soon as a mechanical threshold load is exceeded. This failure at the predetermined breaking point ensures that the shrinkage processes in the cast component are countered or opposed by reduced forces of the holding core as the holding core of plastic now can follow the shrinkage processes in a certain tolerance range due to the broken predetermined breaking point. Therefore, also this embodiment of the holding core of plastic with predetermined breaking point ensures that a cast component can be produced with a sufficient exactly positioned insert, wherein at the same time the likelihood of mechanical damages of the cast part during a cooling process is reduced.

According to a further embodiment, the holding core is a cylindrically or conically formed pin which protrudes into the mold cavity and which comprises a plastic sleeve, wherein the plastic has an approximately heat-independent strength or a heat-dependent strength which decreases with increasing thermal load.

In the same way as a holding core of plastic may be used, it is preferred to use a cylindrically or conically shaped pin as holding core having a plastic sleeve as connection element to the insert which is placed or screwed thereon. Due to the material design of the plastic used, the plastic sleeve has the same characteristics as they have been described above in combination with the holding core of plastic. Here, however, the providing of a hybrid holding core may be used consisting of a dimensionally stable inner pin, preferably of metal, ceramic or a plastic, and the plastic sleeve arranged thereon. While the plastic sleeve has a strength behavior adapted to the occurring heat amounts (see above), the used pin ensures the position stability of the insert in the mold cavity. From this it follows that the basic position of the insert in the mold cavity and in the later cast component is realized by the pin. The plastic sleeve, which may also be realized on the pin and/or at the inner side of the insert, ensures a movability of the insert around the basic position. Thus, the plastic layer ensures a tension reducing freedom of movement for the insert in the cooling cast component based on the material characteristics of the plastic.

Also following the already above-described embodiments, it may be further preferred that the holding core is formed as a cylindrically or conically shaped pin which protrudes into the mold cavity and which comprises a plastic sleeve with at least one predetermined breaking point ensuring a failure of the plastic sleeve transversely to a longitudinal direction of the plastic sleeve. The here-described plastic sleeve having at least one predetermined breaking point has the same characteristics as the above-described preferred holding core of plastic with predetermined breaking point. The failure due to the presence of the predetermined breaking point is limited here, however, to the plastic sleeve as the stabilizing inner cylindrically or conically shaped pin maintains its position and stability despite the failure of the predetermined breaking point. However, also with this embodiment of the holding core, shrinkage processes in the cast component are compensable so far that no damaging mechanical tensioning conditions occur at the insert and/or at the cast component. Further, it is ensured that the cast component may develop its desired shape and dimension prior to the deforming without that holding cores being present in the mold cavity negatively affect these material shrinkage processes.

The present disclosure further comprises an insert, especially a threaded insert, which is moldable into a metal cast part or a plastic injection molded part. This insert comprises the following features: an at least partly open outer wall and an inner cavity, an inner wall of the inner cavity being at least partly coated with plastic or the inner cavity being at least partly provided with plastic so that the inner cavity is sealed against an entering of molten metal or plastic from the outside at least partly, preferably completely. It is for example advantageous to allow a partial entering of molten material at the face side of the insert or wire thread insert facing away from the inner wall of the casting mold. In this way, the insert is anchored in the solidified or cured material without affecting the functionality of the insert. Such inserts are for example threaded inserts or connection inserts by means of which a connection in the cast part is later producible by means of an appropriate connection element like a threaded bolt.

These inserts, as for example a wire thread insert, are characterized by radial intermediate spaces due to the wound wire coil. Further, a wire thread insert comprises at its opposite face sides an opening, respectively, through which also molten material may enter the interior of the wire thread insert. The same applies to other threaded inserts, as for example a sleeve-like threaded insert of brass having an inner thread which comprises at least two oppositely arranged front-end openings. A coupling of a bayonet closure is also conceivable which may comprise the respective openings in the radial outer wall through which the molten material may enter during a casting method.

For sealing the inner cavity of the insert from the inside against the entering of molten material from the outside, preferably the inner side of the cavity of the insert may be provided with a plastic layer or at least partly filled with plastic. The plastic closes gaps and intermediate spaces so that molten material cannot enter the inner cavity of the insert through the radial outer wall.

According to an embodiment, a formed plastic collar is provided at the insert one-sided on the face, which forms a sealing element against molten metal or molten plastic in operative connection with the wall of a casting mold, especially a casting mold according to one of the above-described embodiments. This plastic collar formed as sealing element comprises preferably a different radial extension. According to an embodiment, the plastic collar extends in radial direction up to the or beyond the outer circumference of the insert. According to a further embodiment, the plastic collar is formed annularly and preferably abuts a holding core with its inner opening.

According to a further embodiment of the insert, the inner cavity thereof is completely filled with plastic, wherein the formed plastic protrudes pin-like and on one side beyond the insert. In this way, the sealing plastic in the interior of the insert is functionally designed so that it also forms a holding core which is positionable in the casting mold. While the holding core has a sufficient stability during the casting process, it is removable without residues from the insert after the casting method is completed.

It is further preferred to fill the inner cavity of the insert only partly with plastic. As part of this plastic filling of the inner cavity of the insert, a cylindrically and/or conically shaped inner space is formed in which a holding core of complementary configuration or similar configuration is receivable. In this way, the insert is securely positionable on the holding core while the holding core presses at the same time the plastic filling of the insert radially outwardly. This radial outward pressure supports the sealing function against the entering of molten material.

According to an embodiment, the insert is a wound wire thread insert, preferably a wire thread insert wound on block.

With respect to the insert, it is further preferred that a plastic sleeve is provided which coats or covers an interior of the insert, wherein the plastic of the plastic sleeve has an approximately heat-independent strength or a heat-dependent strength which decreases with increasing thermal load. It is further preferred that a plastic sleeve which coats an interior of the insert is provided with at least one predetermined breaking point ensuring a failure of the plastic sleeve transversely to a longitudinal direction of the plastic sleeve.

The here-described coating plastic sleeve of the insert has, with respect to its material construction, the same characteristics as they have been described above in context with the holding core of plastic as well as with the plastic sleeve on the cylindrically or conically formed holding core. In difference to the plastic sleeve on the cylindrically or conically formed holding core, here the plastic sleeve is not arranged on the holding core but directly in the interior of the insert. However, as the plastic sleeve in the interior of the insert fulfills also the same functions as a plastic sleeve on the cylindrically or conically formed holding core, the respective configurations of the plastic material and the configuration and arrangement of the at least one predetermined breaking point apply here in the same way.

The present disclosure comprises also a casting preparation method by means of which an insert of a casting mold, i.e. a metal casting mold or a plastic injection casting mold, is adapted to a respective metal casting method or a plastic injection method. The casting preparation method prepares the insert to the effect that at the casting of a molten metal or molten plastic into the respective casting mold, an entering of molten plastic or molten metal into the insert during the casting method is at least partly prevented. Such a preparation of the insert reduces the cycle times of a casting method. The casting preparation method comprises the following steps: at least partially coating an inner cavity of the insert with sealing plastic and providing a one-sided front or face-end and circumferential collar at the insert, which forms a sealing element to a wall of a casting mold.

As already indicated above, different inserts for metal cast parts or plastic injection molded cast parts are known which have an at least partially open outer wall. If in this context, for example, a wire thread insert is considered than this wire thread insert has on its radial outer side more or less large distances between adjacent windings depending on its construction. Further, at the axial front-ends or on the face sides of the wire thread insert openings are present to be able to screw for example at least from one side a threaded bolt into the wire thread insert installed in the cast part. Thus, the radial outer sides and the front-ends of the wire thread insert, which are here considered as outer walls, have at least partially openings which have to be sealed against the entering of molten material during the later casting method at least partially, preferably completely. Only by proceeding this way it can be prevented that molten plastic or molten metal enters the interior of the insert, for example a threaded sleeve, a wire-thread insert or also an enforcing sleeve for a later through opening, and thereby blocks the later function of the insert.

For the preparation of the insert to the casting method, the inner cavity of the insert is sealed by a plastic coating at the inner wall of the insert. This plastic coating sealingly fills cavities and gaps so that connections between the inner cavity and the surrounding of the insert are interrupted by the outer wall. According to an embodiment, this plastic coating is formed by a thin layer in that for example the inner cavity is coated or spray-coated with the sealing plastic. According to a further embodiment, the inner cavity of the insert is completely filled with plastic so that no inner cavity is present in the insert anymore. While the applying of the sealing plastic layer on the inner wall of the cavity of the insert leaves the possible front-end openings of the insert open, a complete filling of the interior of the insert provides a complete sealing of the complete possibly open outer wall of the insert. But also in combination with the plastic coating it is preferred to close at least a front-end opening of the insert by a plastic wall.

In context with the casting preparation method, it is further preferred that the inner cavity of the insert is filled or spray-coated completely and such that a plastic holding core is formed which protrudes on the face side beyond the insert, wherein the plastic has an approximately heat independent strength or wherein the plastic has a heat dependent strength which decreases with increasing thermal load and/or wherein the plastic holding core comprises at least one predetermined breaking point which ensures a failure of the holding core transverse to a longitudinal direction of the holding core. In this context it is also preferred that the interior of the cavity of the insert is filled or spray-coated such that an at least partly cylindrical and/or conically shaped receiving space for the holding core results, wherein the plastic has an approximately heat independent strength or wherein the plastic has a heat dependent strength which decreases with increasing thermal load and/or wherein the plastic in the interior of the insert has at least a predetermined breaking point which ensures a failure of the plastic in the cavity of the insert transverse to a longitudinal direction of the holding core.

The plastic used for the holding core as well as the plastic used for a filling or coating of the inner cavity of the insert are formed in the same way as it has been described already above. Especially, preferably the material characteristics of the used plastic are adapted in different ways to the heat being present in the cast part during the manufacturing method of the cast part and to occurring material shrinkage processes. Accordingly, it is preferred for different cast components that the used plastic maintains its strength despite varying heat influences. In the same way, it is preferred at other cast components that the plastic decreases its strength with increasing heat and then again increases its strength with increasing cooling. By means of this material design, material shrinkage processes in the cast component after the filling of the cast cavity are considered so that these material shrinkage processes do not lead to a damaging of the cast component. In the same way, it is preferred to achieve a specific failure of the plastic holding core or the partly with plastic filled or coated interior of the insert by means of the predetermined breaking point in the plastic. This specific failure by means of the used predetermined breaking point ensures also the avoiding of critical mechanical stress conditions in the cast component. In summary, due to the flexibility of the plastic as well as due to a specific failure of the plastic, compensation rooms are created in the cast component which compensate shrinkage processes of different intensity in the cast component compared to the mold surrounding the cast component. Thereby, it is possible that the cast component can be mechanically relieved already prior to the demolding while the cast component and the mold cool down.

Further embodiments provide that the inner sealing plastic coating or plastic filling in the wire thread insert is combined with a one-sided and front-end circumferentially arranged collar. This collar forms a part connected to or continuous with the plastic filling or plastic coating or it is formed separate from this plastic filling or plastic coating at the front-end of the wire thread insert or generally of the insert.

According to a further embodiment, a plastic holding core is formed at the same time with the complete filling of the inner cavity of the insert which protrudes from the inner cavity at least one-sided on the face side beyond the insert. This holding core is fastenable in a casting mold so that the insert is arranged adjacent to the inner wall of a mold cavity of a metal casting or a plastic injection casting mold.

For realizing a sealing on at least one of the front-end faces of the insert in addition to the sealing effect of the plastic coating or plastic filling in the inner cavity of the insert, the insert comprises in addition to the plastic coating or plastic filling a one-sided front-end arranged circumferential plastic collar. This plastic collar is formed preferably annularly or disc-like with central opening and covers at least partly a front-end of the insert. As soon as the insert is arranged in a metal casting mold, this front-end collar provides a sealing of the insert against a front-end entering of molten material. Because the collar is clamped between the insert and an inner wall of the mold cavity of the metal casting mold or the plastic injection casting mold so that gaps and cavities at the interface between the inner wall of the mold cavity and the insert are closed due to the flexible or compressible or deformable material of the collar. This collar is preferably combinable with a sealing plastic coating in the interior of the insert as well as with a complete plastic filling, for example in the form of a holding core, of the insert.

According to a further embodiment, an inner cavity of the insert is coated or spray-coated such that an at least partly cylindrically and/or conically formed receiving space for a holding core results. If, for example, a holding core is provided which can be inserted into the casting mold or which is installed there permanently, then preferably the shape of the cavity of the inner sealing plastic filling of the insert is adapted to the outer shape of the holding core. Such an adaption in shape of the interior of the plastic filling of the insert provides for a reliable hold and a position stability of the insert during the casting method. According to an embodiment, the cavity in the plastic filling of the insert is formed at least partly complementary to the outer shaping of the holding core. According to another embodiment, this cavity in the insert is formed undersized compared to the outer dimensions of the holding core so that after plugging or arranging the insert on the holding core this insert is held there by a press-fit. In the same way, a conically shaped interior of the insert provides that the insert can be fastened on an also conically formed holding core by means of a press-fit. Besides a stable fastening, such a press-fit provides that the inner plastic coating of the insert is pressed radially to the outside. In this way, the sealing function of the inner plastic filling of the insert is supported.

According to a further embodiment, the insert is screwed onto a holding core with outer thread or is plugged onto a holding core without outer thread. According to a further step of the casting preparation method, the one-sided front-end circumferential collar is molded to a side of the insert.

The present disclosure relates also to a metal casting method or a plastic injection molding method by means of which at least an insert is fastenable in a metal cast part or in a plastic injection molded cast part. In summary, the metal casting method and the plastic injection molding method are referred to as casting method. This casting method comprises the following steps: providing a casting mold (Step SI in FIG. 24), preferably a casting mold according to the above described embodiments, having a mold cavity, providing an insert (Step SII in FIG. 24), preferably an insert according to the above-described embodiments and/or prepared with the casting preparation method, positioning the at least one insert within the mold cavity by means of a positioning device (Steps SIII, SIV, SV, SVI in FIG. 24), arranging a sealing element between the insert and an inner wall of the mold cavity by means of which the insert is at least partly sealable against an entering of molten metal or molten plastic (Steps SIII, SIV, SV, SVI in FIG. 24), casting the mold cavity with a molten metal or molten plastic (Steps SVII in FIG. 24) and demolding the cast part (Step SVIII in FIG. 24).

As part of the metal casting method or the plastic injection molding method, the inserted sealing element between the insert and the inner wall of the mold cavity is formed by a separate, preferably annular or disc-like and flexible sealing element or by a collar formed at the insert. By arranging the insert in combination with this sealing element, may it be loose or molded to the insert, the sealing element is compressed between the front-end of the insert and the inner wall of the mold cavity at least so far that the sealing element develops its sealing effect at the interface between the insert and the inner wall of the mold cavity. For positioning the insert in the mold cavity, a pluggable holding core or a rigidly installed holding core is used as it has been mentioned already above in its different embodiments. Thus, the holding core comprises preferably a thread for screwing the insert thereon or a cylindrical or conical shape onto which the insert can be plugged or arranged.

If the casting mold does not have a permanently installed positioning device, it is preferred that a positioning device made of a holding core of metal or plastic or ceramic is provided which can be releasably, preferably plugged, or otherwise fastened in an opening of the inner wall of the mold cavity. As part of the casting method, then, preferably a fastening of the holding core with plugged on or screwed on insert with one-sided front-end circumferential collar as sealing element in the mold cavity or a fastening of the holding core with plugged on or screwed on insert in the mold cavity takes place, wherein a separate sealing element is arranged between the insert and the inner wall of the mold cavity. Alternatively to the just described embodiment it is also conceivable that a holding core of metal or plastic or ceramic which is fastened permanently at the inner wall of the mold cavity is provided as positioning device. Accordingly, and as part of the casting method, the insert with one-sided front-end circumferential collar as sealing element is plugged or screwed onto the holding core in the mold cavity or the insert is plugged or screwed onto the holding core in the mold cavity such that a separate flexible sealing element is arranged between the insert and the inner wall of the mold cavity.

These preferred method steps are designed similarly in their functionality as the fastening of an insert with an already therein arranged holding core in a mold cavity. Here, the holding core or another suitable positioning device is just permanently installed in the mold cavity so that during the casting method or shortly prior to the casting of the molten material, first of all the insert has to be fastened on this positioning device, for example a holding core with or without thread.

According to a further embodiment of the casting method, the positioning device consists of a holding core of metal or plastic or ceramic which is arranged movably in the inner wall of the mold cavity. On this basis, the casting method comprises the following steps: plugging the insert onto the holding core without thread in the mold cavity or screwing the insert onto the holding core with thread in the mold cavity, wherein the insert comprises a one-sided front-end circumferential collar as sealing element, or plugging the insert onto the holding core without thread in the mold cavity or screwing the insert onto the holding core with thread in the mold cavity, wherein a separate sealing element is arranged between the insert and the inner wall of the mold cavity. In a further embodiment of the casting method, a removing of the holding core with or without thread from the insert occurs after the casting of the mold cavity with metal or plastic and prior to the demolding of the cast component from the mold cavity.

Generally, at this course of procedure it is provided that after the filling of the mold cavity with cast material and after starting of the solidification process of the cast material, the at least one holding core is removed from the mold cavity. As the removing of the at least one holding core takes place prior to the demolding of the cast part, the at least one insert of the cast part has now a greater freedom of movability during the cooling process within the mold cavity. As the holding core does not counteract the shrinkage processes occurring within the cast material, no failure or deformation relevant mechanical stresses are generated in the cast component in this context. A further advantage is that a later demolding of the cast component from the mold cavity is to be performed after removing of the at least one holding core. Because after at least one holding core has been removed from the mold cavity, it is no more necessary that the orientation of the holding core within the mold cavity is considered during the demolding process.

According to a further embodiment, the above-described casting method is a pressure-supported metal casting method, preferably a die casting method for aluminum, magnesium, an alloy including these metals or another similar metal material.

The present disclosure further comprises a cast part of metal or plastic, especially a plastic injection molded cast part or a metal cast part, with an integrated insert, especially a wire thread insert, the insert of which has an inner cavity being at least partly free from hardened molten material and having at least one-sided front-end an entrance opening without hardened molten material. The metal cast part is, thus, characterized by the preferred effect of the above-described sealing measures of the insert prior to the casting method. Because the flexible sealing element on at least one of the front-ends of the insert as well as the plastic coating or plastic filling in the cavity of the insert cause that the interior of the insert and at least a front-end entrance into the insert is kept free from hardened molten material. This is especially relevant while using a wire thread insert or another type of threaded insert as insert as the first threads are not blocked by hardened molten material. This is especially important if the casting method is performed with a low viscous molten material or with a molten material being under pressure, which especially at casting methods known up to now enters the smallest gaps and openings and thereby blocks the function of inserts at least partly or makes a costly after-processing necessary. Preferably, the cast part is producible with the above-described casting method. While the manufacturing of a cast part with one-sided accessible insert, for example a wire thread insert, has been described so far, it is also preferred to provide a through-opening with an insert in the described casting method. In this case, the insert is sealed adjacent to at least two inner walls of the mold cavity by the loose sealing element (see above) or the formed or molded collar (see above), respectively. The above-described constructive and functional features which have been described above with respect to the one-sided sealing, apply therefore analogously also to the multi-sided sealing of the insert.

4. DESCRIPTION OF THE DRAWINGS

Figure 2:
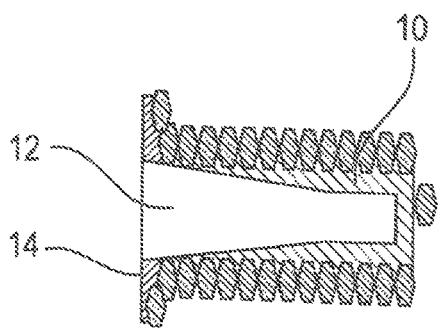
Figure 3:
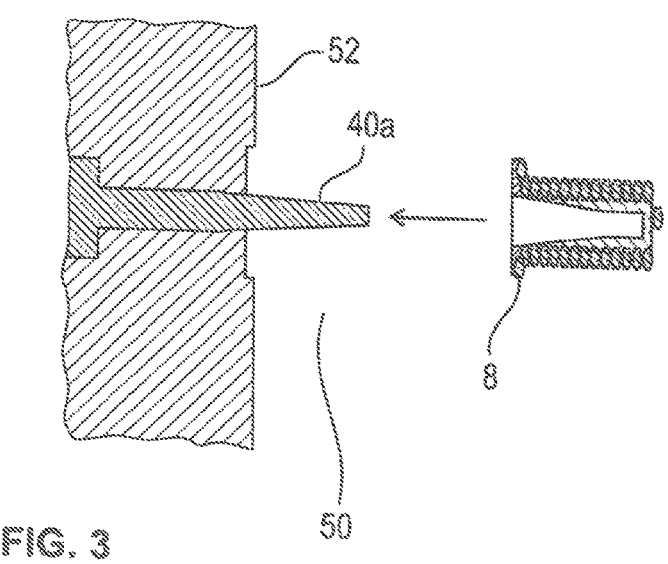
Figure 4A:
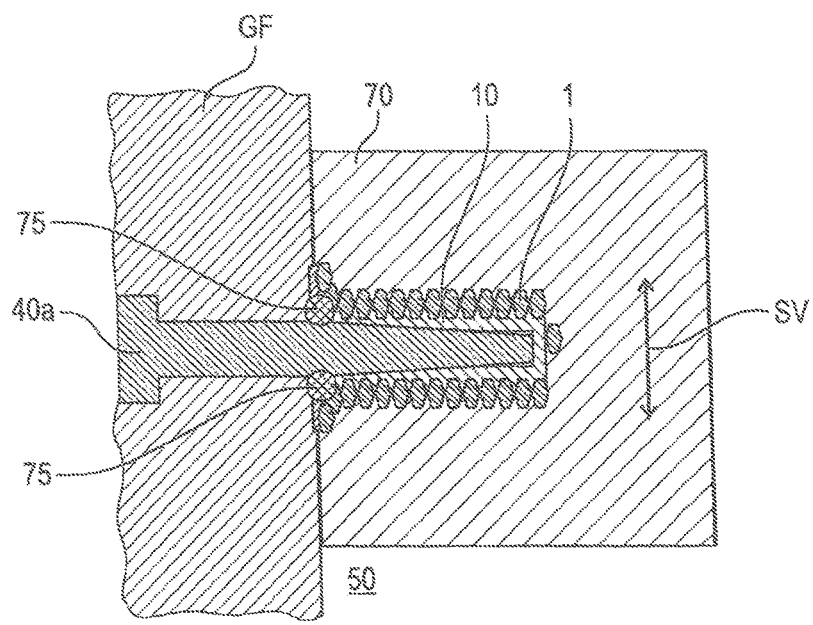
Figure 4B:
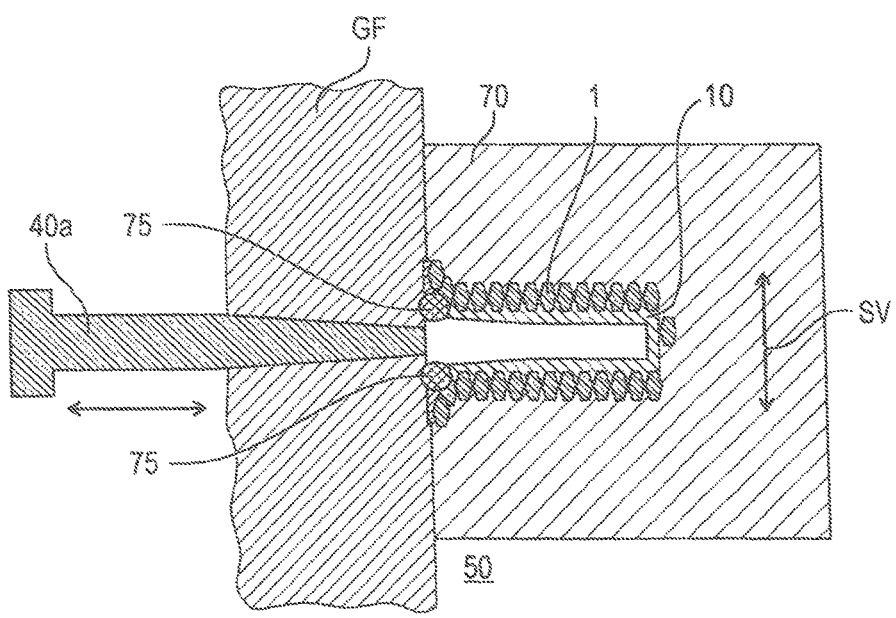
Figure 5A:
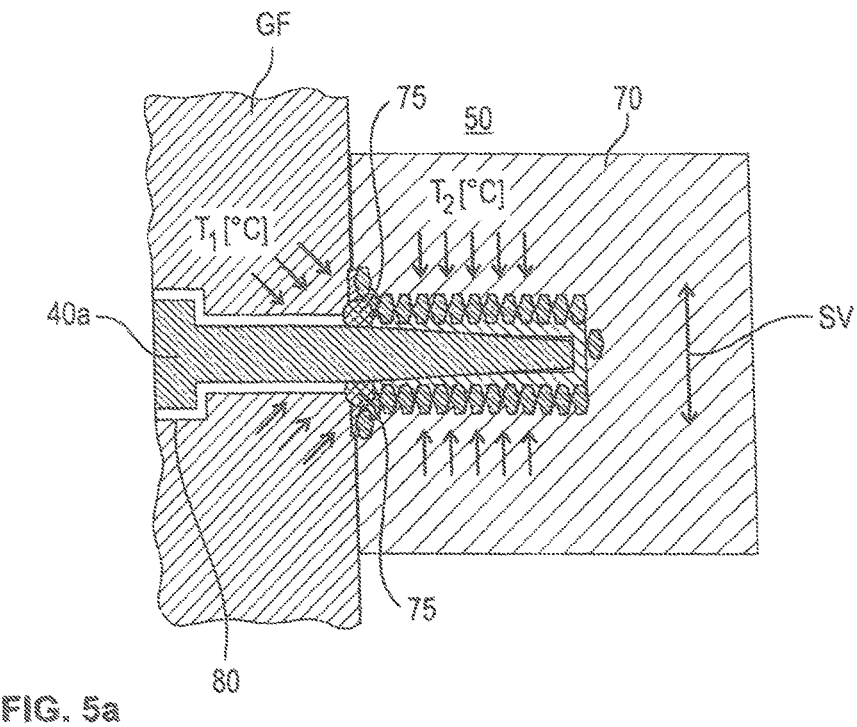
Figure 5B:
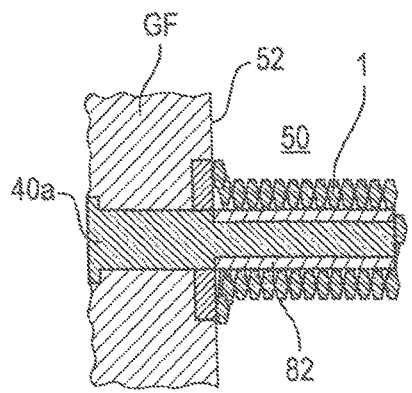
Figure 5C:
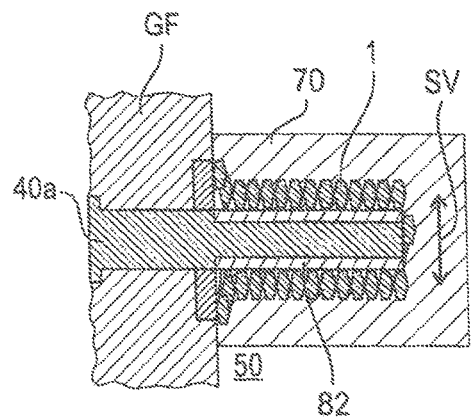
Figure 6:
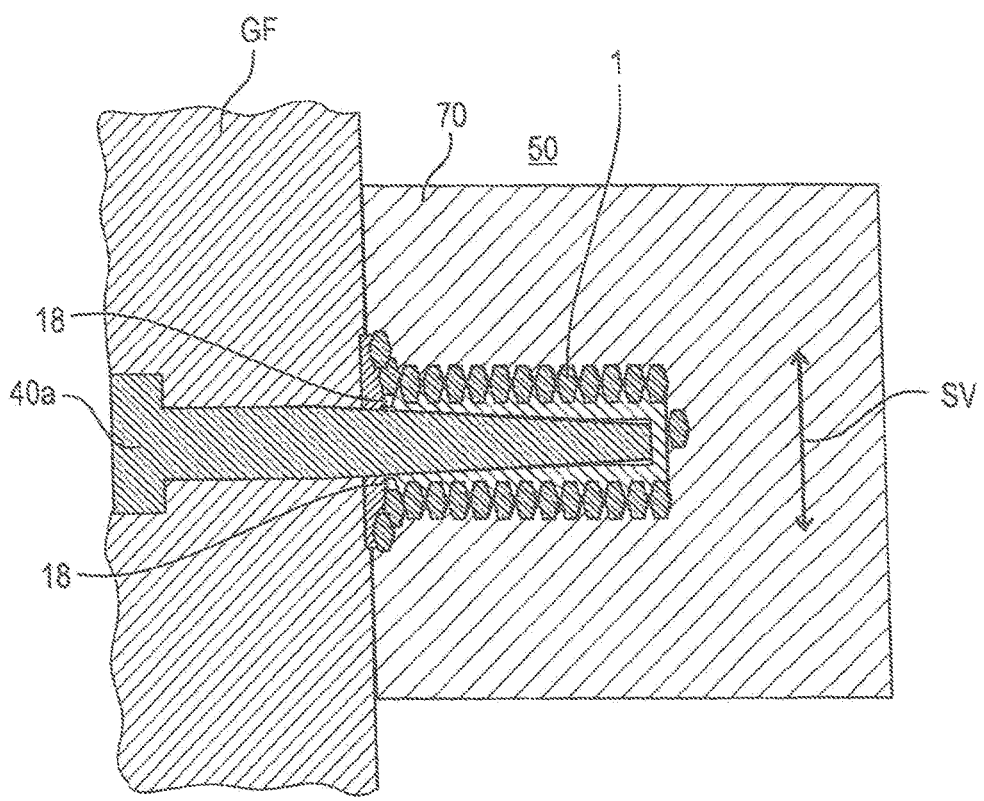
Figure 7:
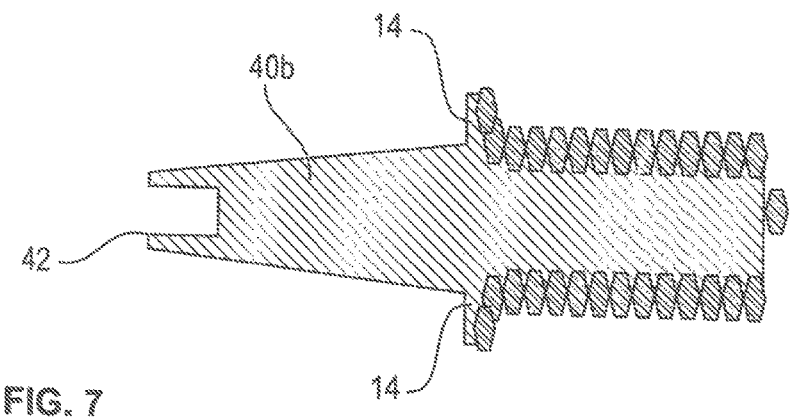
Figure 8:
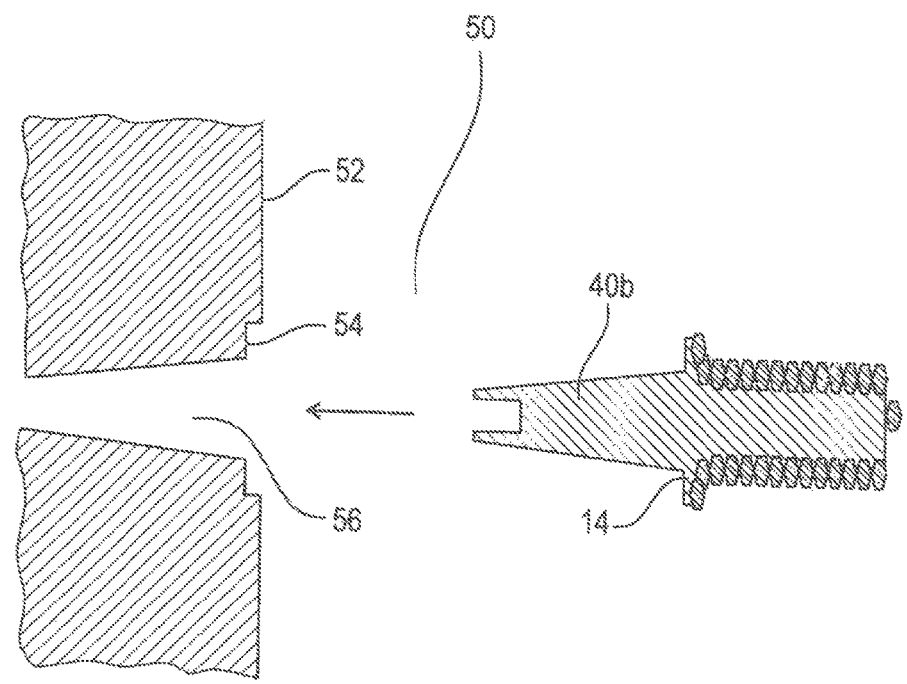
Figure 9:
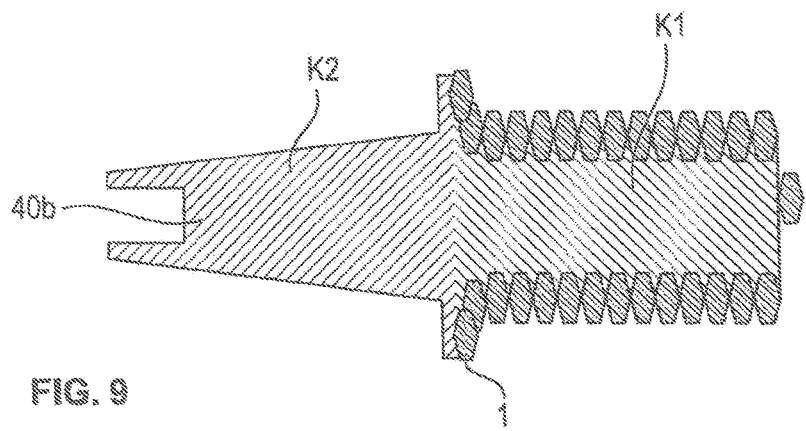
Figure 10:
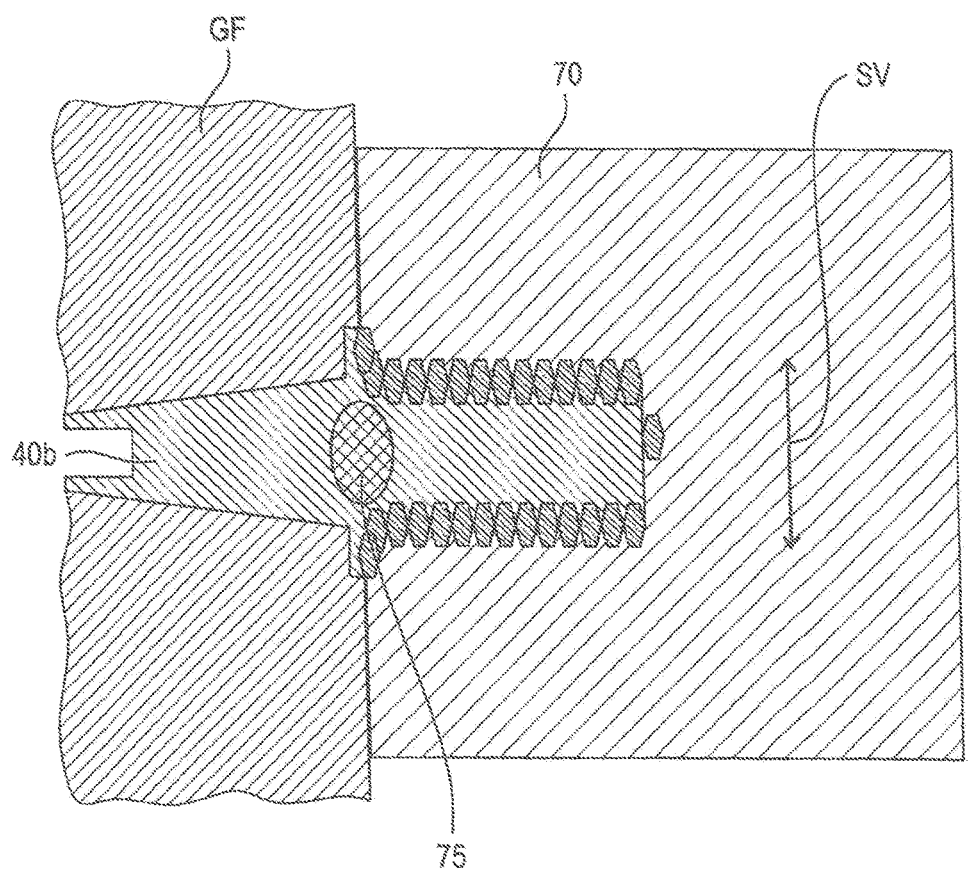
Figure 11:
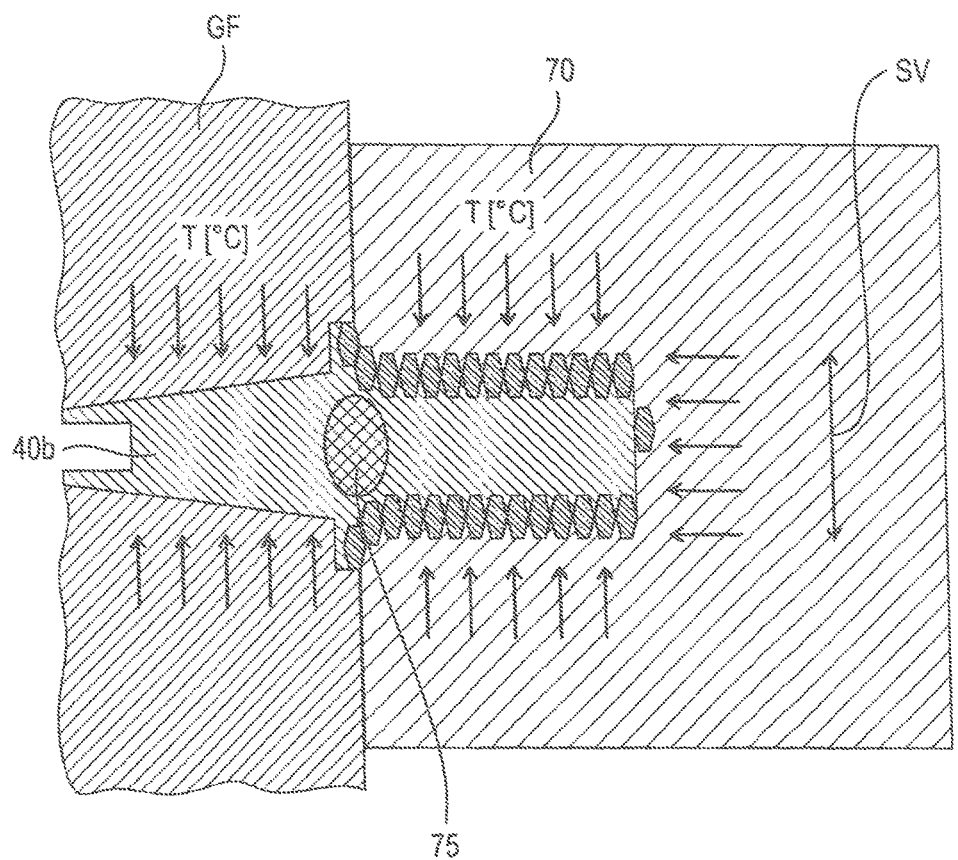
Figure 12:
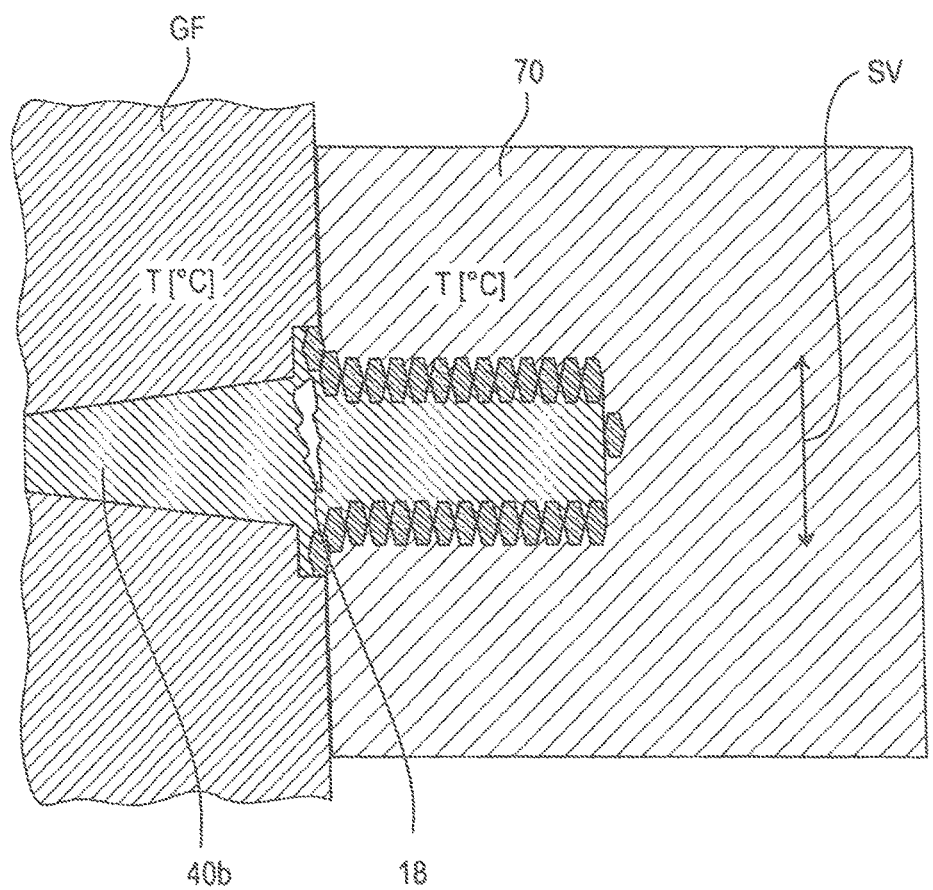
Figure 13:
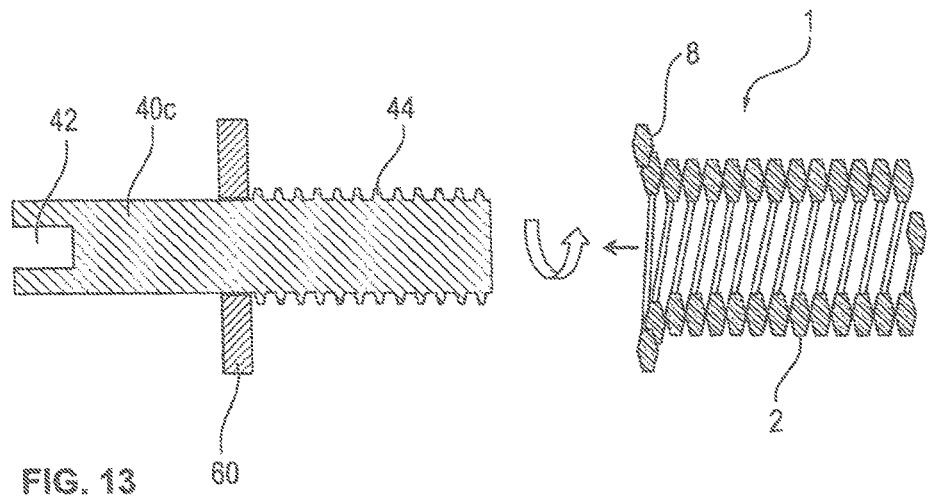
Figure 14:
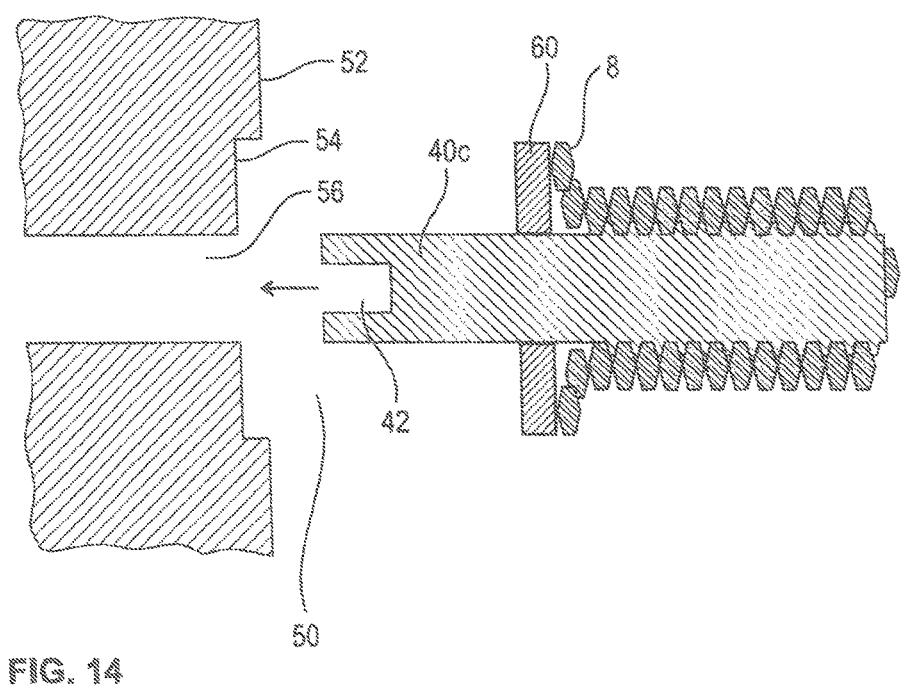
Figure 15A:
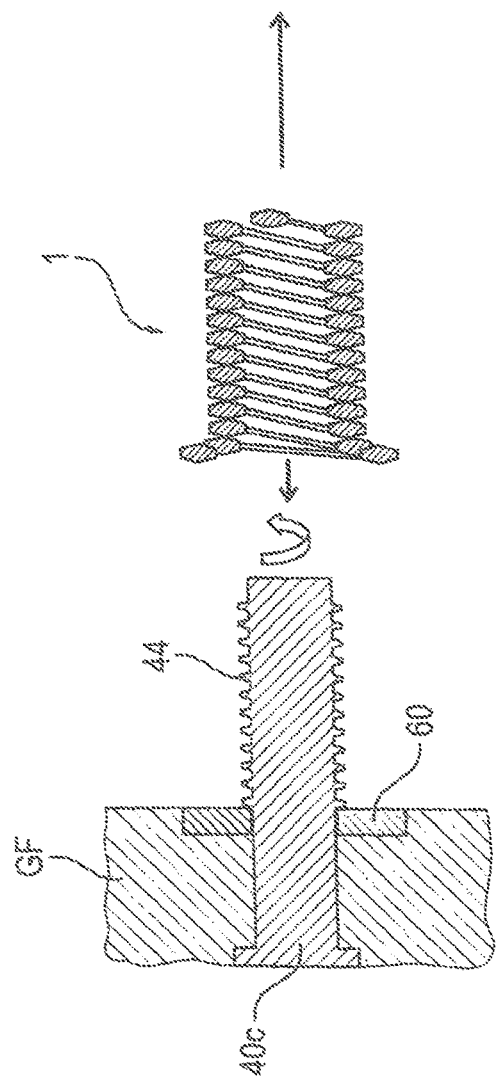
Figure 15B:
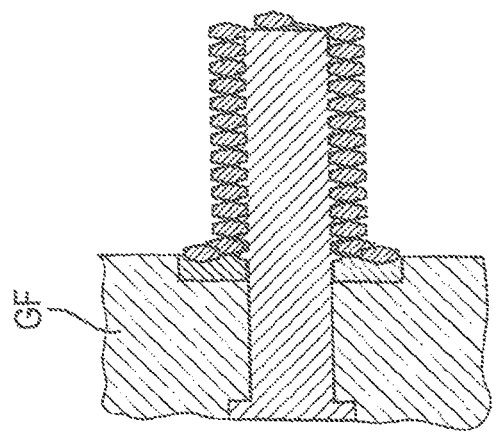
Figure 17:
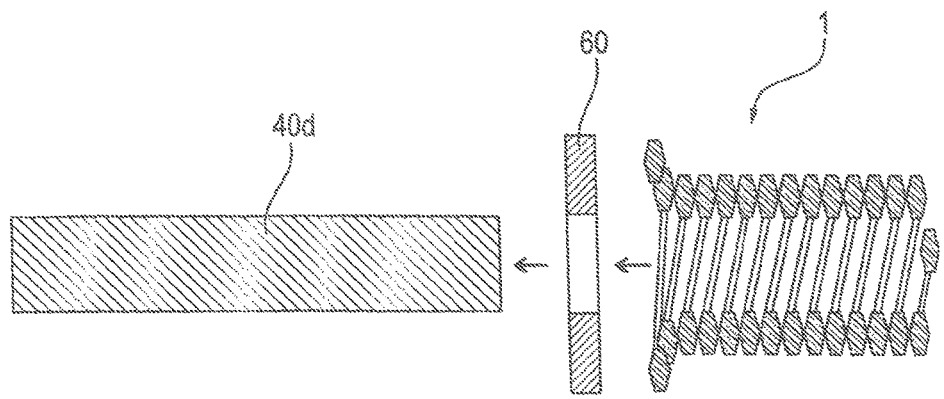
Figure 17A:
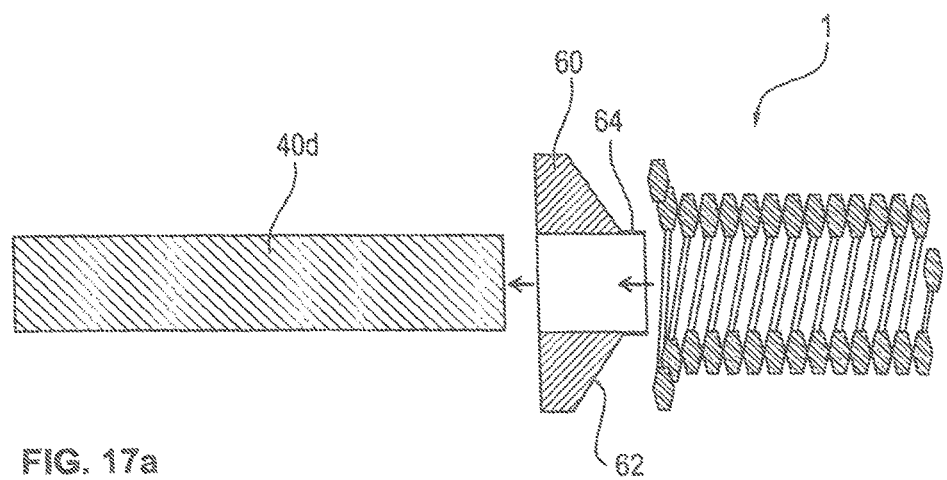
Figure 18:
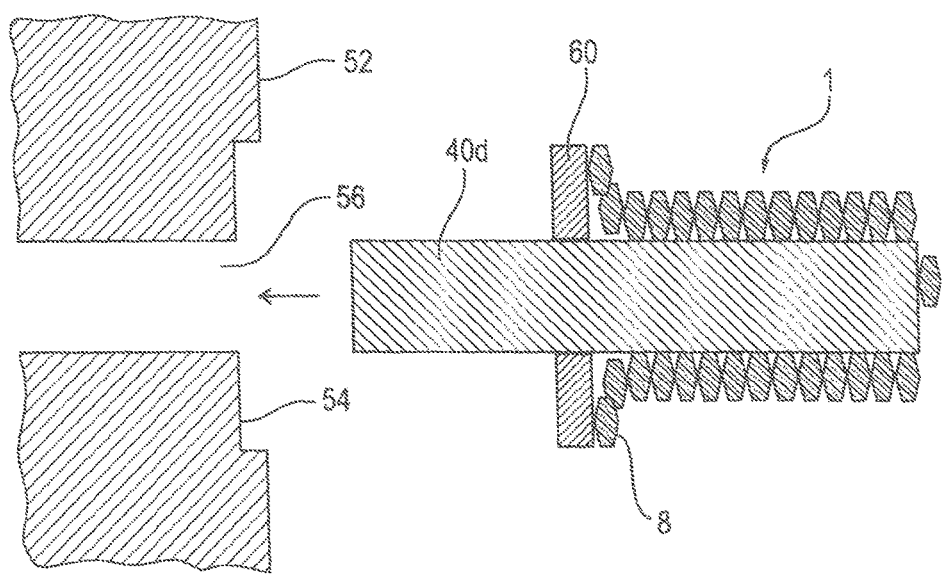
Figure 19:
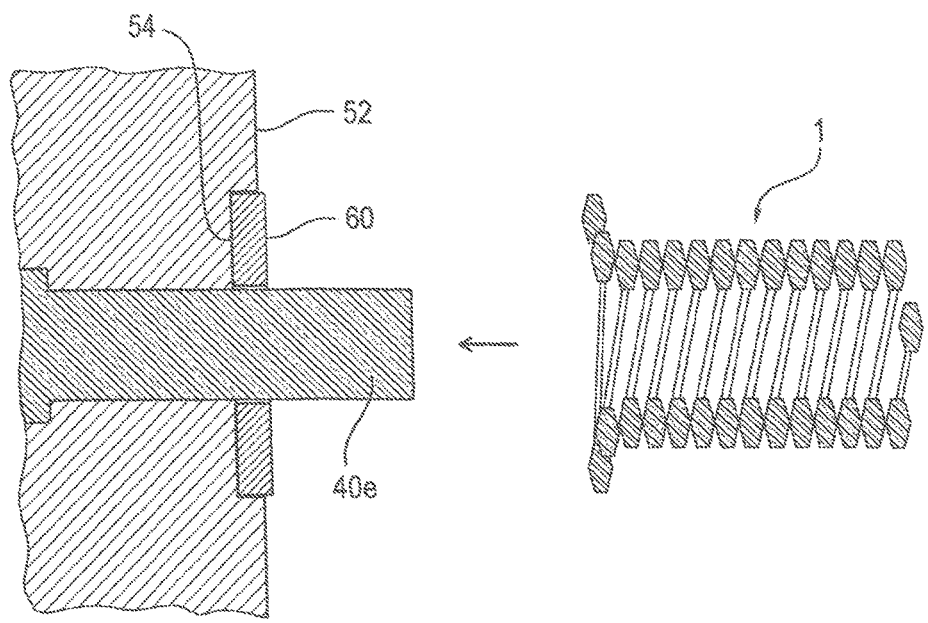
Figure 20:
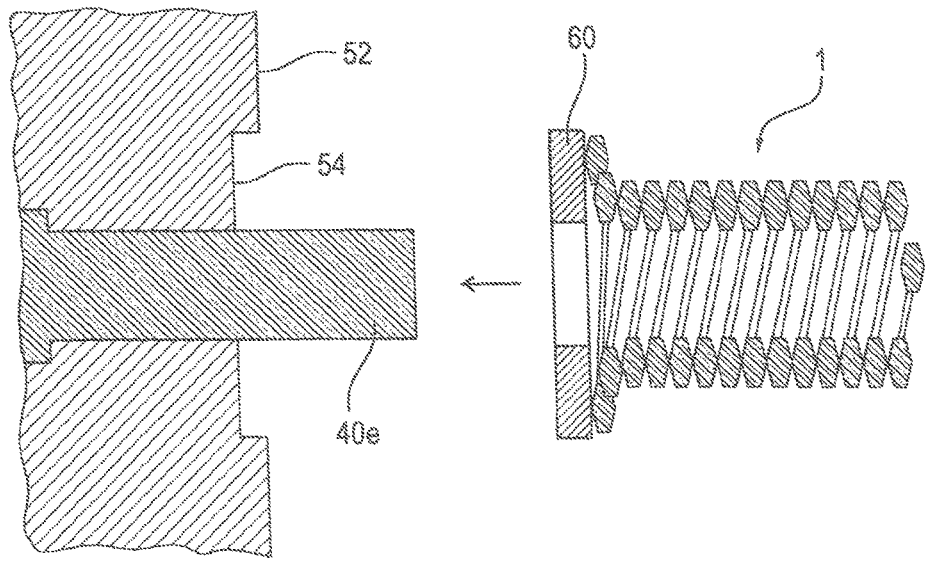
Figure 21A:
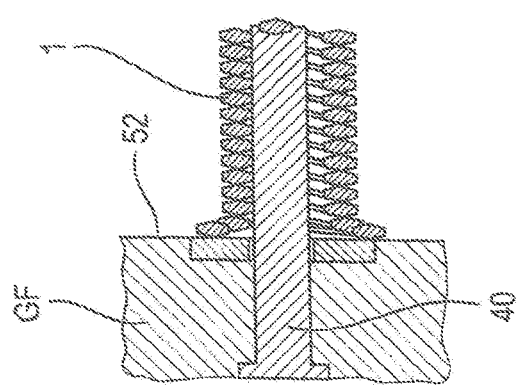
Figure 21B:
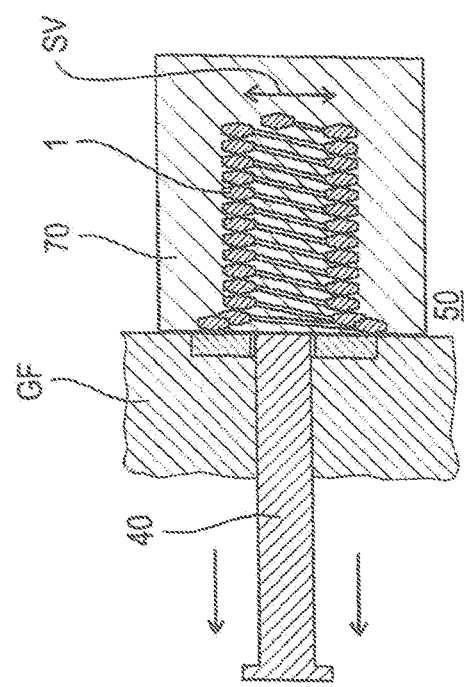
Figure 21C:
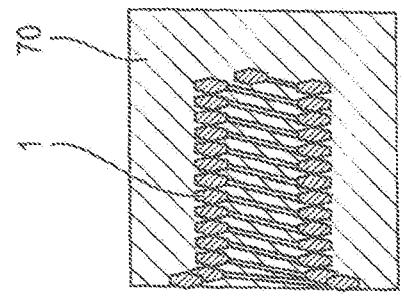
Figure 22:
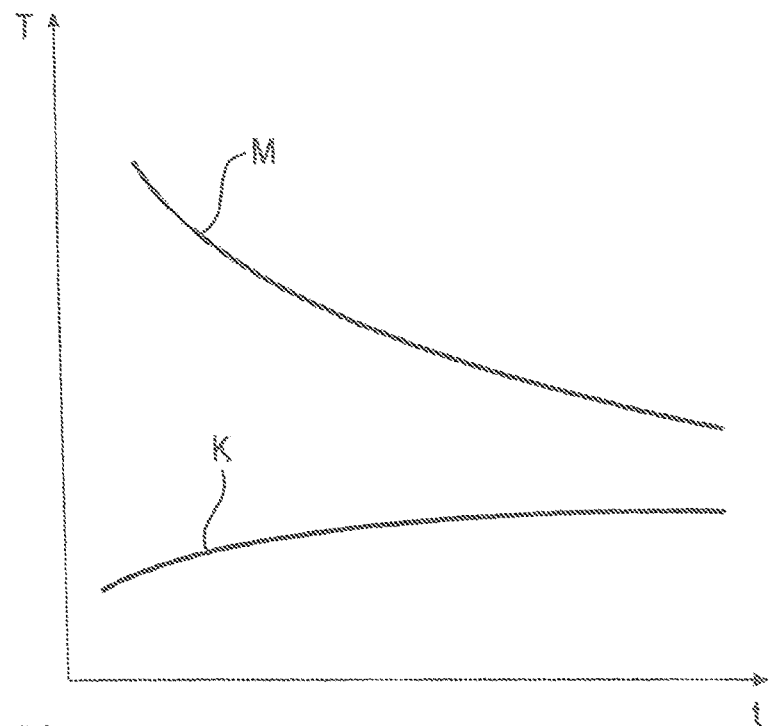
Figure 23:
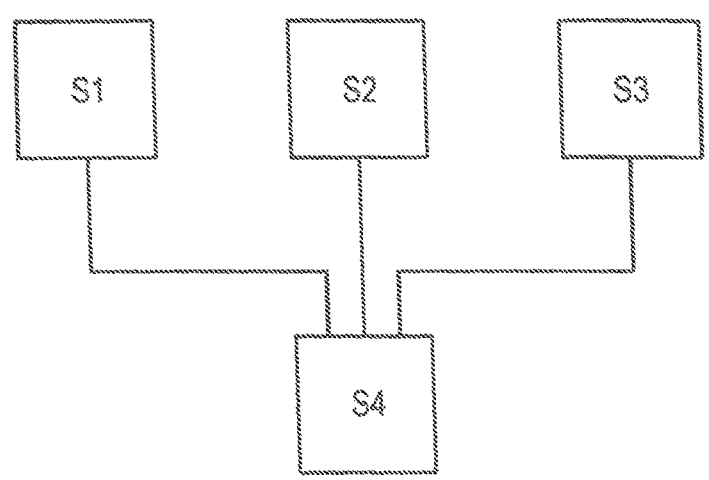
Figure 24:
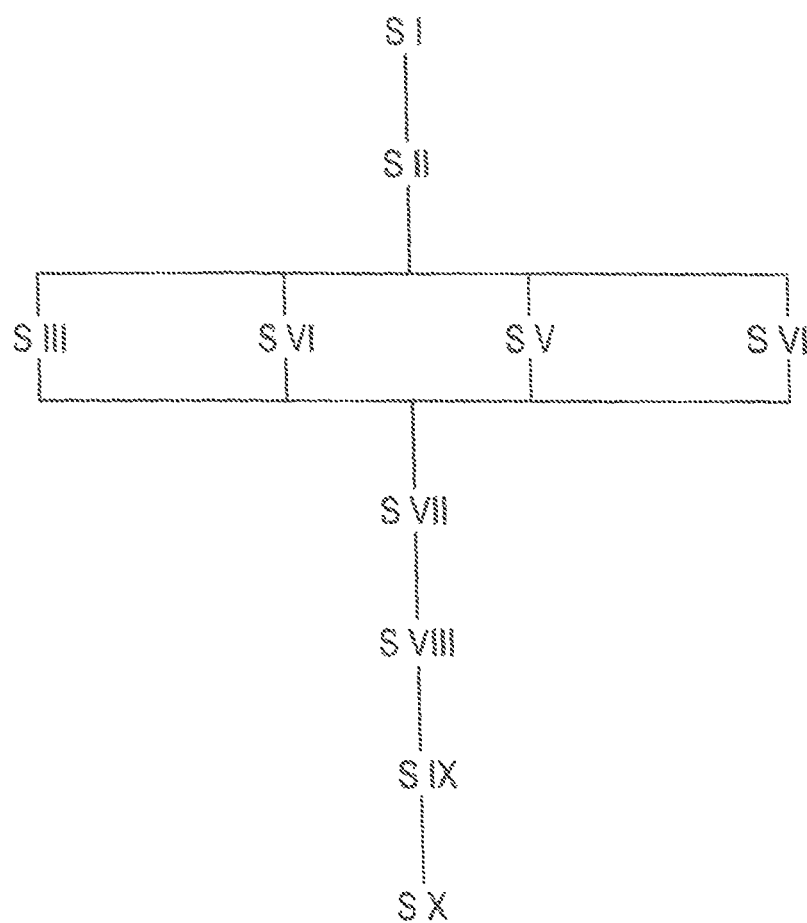

The embodiments of the present disclosure are now described with respect to the accompanying drawings in detail. It shows:

FIG. 1 an embodiment of an insert in the form of a wire thread insert,

FIG. 2 an embodiment of an insert prepared for a casting method,

FIG. 3 a schematic depiction of an embodiment of a casting mold with a positioning arrangement of the insert according to FIG. 2, FIGS. 4a and 4b a schematic depiction of an embodiment of a casting mold with a positioning arrangement of a further embodiment of the insert, FIGS. 5a, 5b and 5c a further schematic depiction of an embodiment of a casting mold with a positioning arrangement for a further insert, FIG. 6 a schematic depiction of a further embodiment of a casting mold with a positioning arrangement and a further embodiment of the insert, FIG. 7 a further embodiment of an insert prepared for a casting method, FIG. 8 a schematic depiction of a further embodiment of a casting mold with a positioning arrangement of the insert according to FIG. 7, FIG. 9 a further embodiment of an insert prepared for a casting method, FIG. 10 an embodiment of an insert positioned in a mold cavity by means of a preferred holding core, FIG. 11 a schematic depiction of an embodiment of an insert positioned with a holding core in a mold cavity under the influences of the casting process, FIG. 12 a further embodiment of a holding core with an insert positioned in a mold cavity, FIG. 13 a schematic depiction of an arrangement of an insert on a holding core, FIG. 14 a schematic depiction of an embodiment of a casting mold with a positioning arrangement of the holding core with an insert according to FIG. 13, FIGS. 15a and 15b an embodiment of the positioning of an insert on a holding core with thread in a mold cavity, FIGS. 16a and 16b an embodiment for a holding core with thread which can be screwed out of a mold cavity, FIG. 17 a schematic depiction of a further arrangement of an insert on a holding core, FIG. 17a a schematic depiction of an embodiment of the sealing element with conical portion, FIG. 18 a schematic depiction of a further embodiment of a casting mold with a positioning arrangement of the holding core with insert according to FIG. 8, FIG. 19 a schematic depiction of a further embodiment of a casting mold with a positioning arrangement for a holding core with insert, FIG. 20 a schematic depiction of a further embodiment of a casting mold with a positioning arrangement of a holding core with an insert, FIG. 21 an embodiment of a holding core onto which the insert can be plugged and which is displaceable out of the mold cavity, FIG. 22 schematic depiction of the cooling of the cast material and the heating of the plastic of the insert, FIG. 23 a flow chart of an embodiment of a casting preparation method, and FIG. 24 a flow chart of an embodiment of a metal casting method or plastic injection molding method.

5. DETAILED DESCRIPTION

FIG. 1 shows a schematic depiction of an insert 1 which shall be fastened during the production of a component by means of a metal casting or injection molding in this component. To such inserts belong threaded inserts, sleeve-shaped plug connectors, wire thread inserts with (see FIG. 1) or without front-end flange and also electrical connectors like a sleeve. Such an insert 1 is positioned in a mold cavity of a metal casting or a plastic injection mold which is subsequently filled with molten metal or molten plastic. The casting mold is schematically shown in FIGS. 3 to 6, 8, 10 to 12, 14 to 16, and 18 to 21. In this way, for example engine blocks or housings for gearings are produced by means of aluminum die casting or plastic device housings are produced by means of plastic injection molding. Preferably, in the metal casting method, light metals, especially aluminum, magnesium and their alloys, as well as zinc, cast iron, copper, steel and their alloys are processed. In the plastic injection molding, preferably known thermoplastics, thermosetting plastics and/or elastomers are used, as for example polyamide (PA), polyoxymethylene (POM), polyether ether ketone (PEEK) or polystyrene (PS).

For reducing the cycle time at the production of cast parts and for ensuring an ideal filling of the mold cavity 50 of the metal casting mold, the molten metal is preferably filled in with a pressure of up to 2,000 bar, preferably 400 to 1,200 bar. To this end, the molten metal reaches in the metal casting mold a metal velocity of up to 100 m/s, preferably 20 to 60 m/s. The viscosity of the molten metal is preferably adjusted to 1 Pa s. At the pressure-supported metal casting and at the die casting, viscosities in the range of 0.8 to 1.5 mPa s are used according to an embodiment.

According to a further embodiment, components with insert 1 are produced in a pressure-supported aluminum casting method or an aluminum die casting method. It is also preferred to use the above-mentioned semi-solid metal casting (SSM) as primary forming method at the processing of metals. At this type of metal casting method, a metal or an alloy is heated up to the transition temperature between solid and liquid. The in this way reached thixotropic state of the metal supports the introducing of the molten metal into the metal casting mold. In this method, for example aluminum or magnesium alloys as well as steels are processed. For semi-solid methods, preferably a viscosity range of 0.01 to 1 Pa s is used. For the preferred plastic injection molding method, known materials are used, as for example the following materials individually or in combination: polystyrene (PS), polycarbonate (PC), polyamide (PA), polyether ether ketone (PEEK), polyimide (PI), polyamidimide (PAI), liquid crystal polymer (LCP), polyoxymethylene (POM) and polymethyl methacrylate (PMMA).

The insert 1 is, according to an embodiment, a wire thread insert. The characteristics of the insert 1 are explained exemplarily based on the wire thread insert shown in FIG. 1. This wire thread insert consists of adjacent windings 2 which abut each other. The windings 2 form a continuous spiral 4 defining a cavity 6. This spiral 4 is open at the front sides, wherein one front side transitions into a flange 8 which tapers radially. The radial outer side and the front sides of the spiral 4 form the outer wall of the wire thread insert which is partly open and thereby creates a connection between the cavity and the surrounding of the wire thread insert. In the same way, also a wire thread insert without flange 8 or with two front-end flanges, i.e. arranged on the front sides, (not shown) is preferred.

If the wire thread insert as insert 1 is incorporated into a cast part, the risk exists that molten metal or molten plastic enters the cavity 6 during the casting method. For avoiding this, the at least partly open outer wall of the wire thread insert is sealed according to an embodiment prior to the performing of the casting method. The sealing takes place in radial and front-end direction by filling the cavity 6 at least partly with a sealing plastic. The filling occurs preferably by means of an injection molding method, whereby, according to an alternative, an inner wall of the cavity 6 is provided in an at least partly, preferably completely, sealing manner with a plastic layer (step S1 of the casting preparation method, FIG. 23). This plastic layer preferably extends beyond the front-side of the wire thread insert which is opposite to the flange 8. The plastic coating on the inner wall of the cavity 6 is, according to an embodiment, formed so thin that the wire thread insert can still be screwed onto a holding core 40c with thread or can be plugged onto a cylindrically or conically shaped holding core 40a, 40d without thread (see below).

According to a further embodiment, the coating and sealing plastic is introduced into the cavity 6 (step S2 of the casting preparation method, FIG. 23) such that the cavity obtains due the plastic layer 10 a shape adapted to a holding core 40a, 40c, 40d or a shape fitting to this shape of the holding core (see FIGS. 2, 13, 17). The plastic layer 10, thus, forms a receiving space 12 for the holding core 40a, 40c, 40d. The receiving space 12 is cylindrically or conically shaped to receive a cylindrically 40d and/or conically formed holding core 40a.

The plastic layer 10 which represents at the same time a plastic sleeve for the holding core 40a, 40c, 40d in the wire thread insert, realizes preferably a complete sealing of the wire thread insert in radial direction and in the direction of the front side facing away from the flange. Further, the wire thread insert is positioned by the plugging on the holding core 40a, 40d precisely and in a force-fit manner by a press-fit in the casting mold. As the holding core 40a urges the plastic layer radially outwardly, a sealing fit of the plastic layer at the windings 2 is thereby supported.

The plastic of the plastic layer 10 is introduced into the wire thread insert preferably by injection molding, gravity casting or by the vacuum casting method.

As will be explained in detail below, the plastic is used preferably for an inner coating of the insert, for the outer coating of the holding core, but also for the manufacturing of a holding core consisting completely of plastic. Due to its material behavior, the plastic realizes a positioning and holding function in the mold cavity 50 of the casting mold GF. For this purpose, the plastic has an approximately heat independent strength. Accordingly, preferably the strength of the used plastic is constant, despite the intense heating and cooling during the metal casting method or the plastic injection molding method. Due to this, a defined orientation and position of the insert 1 in the mold cavity 50 is ensured.

As the strength of the plastic is lower compared to a holding core of preferably steel, mechanical tensions in the cast part 70 are relieved by this plastic of constant strength. This is based on the fact that the plastic may follow shape variations of the cast part 70. Such shape variations have the following origin.

After the insert 1 has been positioned in the mold cavity 50 according to the different alternatives (see complete description), the pressure casting mold is closed and the mold cavity 50 is filled with molten metal or molten plastic. The introducing of the hot molten material takes place with a high velocity and with a high holding pressure. Due to the relative low temperature of the casting mold (GF) compared to the temperature of the molten material, especially at the metal casting, it comes to a spontaneous solidification of the molten material at the wall 52 of the casting mold GF. The cooling of the molten material proceeds from the inner wall 52 of the mold cavity 50 of the casting mold GF into the interior of the cast part 70 and is accompanied by material shrinkage processes. These material shrinkage processes vary in their direction, intensity and/or velocity depending on the geometry of the cast part 70, the material of the cast part 70 and the temperature differences between the casting mold GF and the cast part 70.

The material shrinkage processes cause a position variation of the insert 1 compared to the position of the holding core 40 which results in mechanical tensions in the cooling cast part 70. These mechanical tensions are reduced by a yielding of the plastic, wherefore the plastic preferably has different characteristics (see below). Further, these mechanical tensions are preferably reduced in that the respective holding core 40 is removed (see below) from the insert 1, preferably mechanically and/or hydraulically, after the solidification of the cast material and prior to the demolding of the cast part 70 from the mold cavity. In this way, the holding core does no longer counteract the material shrinkage processes or the plastic yields under the mechanical load of the shrinkage processes which leads to a mechanical relief of the cast component 70.

Further preferred, the plastic forming (see below) the holding core 40 or an inner coating/filling in the insert 1 has a heat dependent strength. This heat dependent strength decreases preferably with increasing thermal load, i.e. with increasing heating of the plastic, to be able to follow shrinkage processes of the cooling cast material. This correlation is shown in FIG. 22, wherein the temperature variation is shown depending on the time. The curve M describes the cooling behavior of the metal or plastic in the cast part. The curve K describes the heating of the plastic in the insert depending on the heat dissipation of the cast material. As the plastic warms up with time, preferably its strength is also reduced. Therefore, the plastic can follow the shrinkage processes occurring in the cast part and critical mechanical tension conditions can be avoided.

According to a further constructive design of the plastic holding core 40b or the plastic coating/filling in the insert 1, at least one predetermined breaking point 18 is provided in the plastic (see below). This predetermined breaking point 18 yields to the material shrinkage processes by failure of the plastic so that mechanical tensions in the cast part 70 are reduced. Preferably, the predetermined breaking point 18 is arranged such that the plastic fails transversely or obliquely to the longitudinal axis of the holding core 40 or the insert 1 and allows thereby a mechanical tension compensation.

In this way, damages at the insert 1 are avoided, as for example a deformation of the thread at the wire thread insert. In this context, it is also conceivable to use the above alternatives individually or in an arbitrary combination with each other.

Further preferred, the wire thread insert comprises at its flange-sided front side a sealing collar 14. The collar 14 is preferably connected to the plastic layer 10 and thereby forms a continuous sealing element in the wire thread insert (see FIG. 2). In the same way, it is preferred to mold the collar 14 separately from the plastic layer 10 or filling (not shown). Preferably, the collar 14 is injected (step S4, FIG. 23 According to FIG. 2, the collar 14 is formed annularly or disc-like. According to an embodiment, the collar 14 has the radial extension of the flange 8 wherein it may also extend radially beyond this flange 8. The collar 14 seals the interface between an inner wall 52 of a casting mold and the flange 8 against the entering of molten material (see FIG. 3). To this end, the collar 14 preferably has a thickness of 0.1 mm to 5 mm in axial direction of the insert or wire thread insert or perpendicular to the inner wall 52 of the mold cavity 50. Further, the collar 14 is preferably formed flexible so that it is ideally adjusted to a surface irregularities on the interface between the inner wall 52 and the flange 8 of the wire thread insert.

Preferably, a temperature-resistant plastic is used for the plastic layer 10 and the collar 14. Appropriate plastics for the metal casting are for example polyether ether ketone (PEEK), polyamidimide (PAI), polyimide (PI), liquid crystal polymer (LCP), polybenzimidazole (PBI), polysulfone (PSU), dental plastics, silicones, fibers or composite materials. Therefore, these are preferably elastomers in the form of silicone or silicone-based materials. Further preferred are thermoplastics as for examples TPE having an increased glass transition temperature.

A positioning of the wire thread insert in the mold cavity 50 of the metal casting or plastic injection mold is shown in FIG. 3. The holding core 40a forms a positioning device for arranging the wire thread insert in the mold cavity 50 in a stable way. As the holding core 40a is preferably formed conically, it supports at the same time in combination with the plastic layer and the collar 14 the positioning, fixing and sealing of the wire thread insert in the mold cavity 50. The conical pitch of the holding core 40a (preferably ⅟₂₀) is preferably designed such that a self-adhesion of the wire thread insert on the holding core 40a is achieved.

The wire thread insert shown in FIG. 2 is protected from the entering molten metal or molten plastic by the introduced plastic on the front sides and on the circumferential side, thus on its outer wall. The inner lying conical receiving portion makes the plugging and fixing with the sealing of the wire thread insert in the casting mold at the same time possible. In coordination with the holding core 40a, the sealing in the thread insert is performed such that a fixing of the wire thread insert on the holding core is achieved based on the principle of self-inhibition. The sealing preferably does not occur by a post-pressing of the holding core 40a or by an additional post-compression by means of air pressure, but is preferably supported thereby. The injected plastic flows at the inner side of the cavity 6 of the wire thread insert directly into the threads so that in this way the sealing of the wire thread insert to the outside is achieved. As the plastic is directly introduced into the cavity 6 of the wire thread insert, preferably in liquid form, no additional mounting aid for introducing a sealing into the cavity 6 is necessary.

By the positioning of the wire thread insert on the holding core 40a, a high position accuracy of the wire thread insert is achieved. Therefore, this construction is especially preferred at the usage of wire thread inserts in aluminum die casting processes with filling velocities of 20 to 60 m/s, in magnesium die casting processes with filling velocities of 20 to 100 m/s and each with repressing pressures of 400 to 2,000 bar, especially 400 to 1,200 bar. After demolding (SVIII) of the component with the sealed wire thread insert from the casting mold, it results preferably by means of the flush end of the flange 8 with the component surface that no material residues or protrusions beyond the component wall have to be removed by processing steps which have to be performed subsequently. Further, the plastic sealing in the wire thread insert ensures a secure protection of the interior of the wire thread insert with respect to damaging or contamination until it is removed.

For being able to realize, besides the position accuracy, also an ideal adaption to shrinkage processes of the cast material, the plastic 10 in the interior of the insert 1 according to FIG. 2 is preferably adapted as it has been described above. This means that the plastic of the plastic layer 10 and preferably of the collar 14 has an approximately heat independent strength or a heat dependent strength which decreases with increasing thermal load. The respective heating of the plastic is schematically shown in FIG. 22.

With respect to FIG. 4, it is schematically shown in a preferred embodiment how shrinkage processes SV affect the cast part 70. The insert 1 is filled with a plastic layer 10 of heat independent strength. The plastic layer 10 serves as fixation on the holding core 40a and as sealing. Preferably, the plastic layer is also seen as plastic sleeve on the holding core 40a. The holding core preferably consists of steel, ceramic, metal or plastic.

After introducing the molten material into the cavity 50, the solidification shrinkage and the shrinkage processes SV occur in the cast part 70, as indicated by the arrow. Especially at the interface between casting mold GF and cast part 70, the form stability of the casting mold GF makes an impact in contrast to the shrinkage processes SV in the cast part 70.

Near the interfaces between holding core 40a and cast part 70, tension and deforming zones 75 are schematically indicated. These tension and deforming zones 75 result because the holding core 40a is held by the rigid casting mold GF and the insert 1 in the cast part 70 tries to change its position due to material shrinkage processes SV. Depending on the cast material used, preferably the shrinkage processes SV of the cast material are small so that a plastic with heat independent strength, which is lower than the strength of the holding core 40a, may compensate or reduce them.

According to FIG. 5a, the shrinkage processes SV have a stronger impact due to the choice of the cast material. Also, the temperature difference between casting mold GF and cast part 70 is decisive as indicated by the marked temperatures $T_1$ in the casting mold GF and $T_2$ in the cast part 70. For relieving the tension and deforming zones 75, the plastic layer 10 consists of a plastic having a heat dependent strength which decreases with increasing heat. The plastic 10 warms up with increasing cooling of the cast material (see FIG. 22). By means of this warming up or heating, the strength of the plastic decreases and its flexibility, thus, increases. Therefore, the plastic can yield the occurring shrinkage processes with increasing warming up and may follow them. This supports the relief of mechanical tensions in the cast component 70 without that the holding core 40a has to be removed from the casting mold GF.

According to a further embodiment, the holding core 40a according to FIG. 4b is removable from the insert 1 after the filling of the mold cavity 50 and prior to the demolding of the cast part 70. This takes place preferably by pulling or rotating/screwing the holding core 40a. The removing of the holding core 40a ensures free shrinkage processes in the cast part 70. Further, only due to the removing of the holding core 40a, just like for the removing of holding cores of arbitrary configuration from the mold cavity 50 with cast part 70, it is possible that the present casting method is applicable to cast parts 70, the inserts 1 and holding cores 40 positioning the inserts 1 of which are not oriented in their longitudinal direction parallel to the extraction direction and/or to the demolding direction of the cast part 70 out of the mold cavity 50. In the same way, the opening movement of the mold halves or mold parts has not to be parallel but can be orientated arbitrarily with respect to the longitudinal axis of the inserts 1 and their holding cores 40. According to a further embodiment, the holding core 40 as well as generally also holding cores of other types (see below) are held in an opening 80 with addable clearance for the holding core (see FIG. 5a). During the filling of the casting mold GF with molten material, the holding core 40a is held in the opening 80 without clearance. As soon as the solidification shrinkage and the shrinkage processes SV start, a specific clearance is allowed in the opening 80 for the holding core 40a. This lateral and/or axial clearance is preferably made possible by releasing the holding core 40a in the casting mold GF so that the holding core 40 in the portion of the opening 80 may move axially and laterally without dropping out. By means of this constructive requirement, any holding core 40 can compensate, alone or in combination with the plastic layer 10, mechanical tensions which are created by solidification shrinkage and/or shrinkage processes SV in the cast part 70.

For this purpose, the holding core 40 is preferably held in a mechanical, electro-mechanical or hydraulically releasable mounting 80. This mounting 80 preferably consists of form- and/or force-fit working components. In the same way, also a piezoelectric mounting 80 is conceivable which clamps the holding core 40 and releases it based on an electrical signal.

In FIGS. 5b and 5c, a further embodiment of a holding core 40a is shown in combination with a functional sleeve 82. While in FIG. 5a, a clearance-giving mounting 80 for the holding core 40a has been described on the tool side, in FIGS. 5b and 5c preferably the clearance-giving functional sleeve 82 is arranged on the holding core 40a, thus on the workpiece side, within the mold cavity 50. The functional sleeve 82 is able to expand and shorten in radial direction. Accordingly, FIG. 5b shows the holding core 40a with the functional sleeve 82 on which the insert 1 has been positioned before molten material has been introduced into the mold cavity 50. In this state, the functional sleeve 82 has a sufficiently large radial extension to fasten the insert 1 on the holding core 40a. After the filling of the mold cavity 50 with molten material and the beginning cooling of the cast material 70, shrinkage processes SV occur in the cast material 70. In order that the insert 1 can follow these shrinkage processes SV and critical mechanical tension states in the cast material 70 are avoided by the holding of the holding core 40, the radial extension of the functional sleeve 82 is reduced. In this way, a clearance between the functional sleeve 82 and the insert 1 results. Such a functional sleeve 82 thus realizes functionally a radial clamping and releasing of the insert 1 on the holding core 40a preferably depending on the material shrinkage processes SV. Therefore, all materials and sleeve constructions are suitable as functional sleeve 82 which can realize such a radial clamping and releasing in a controlled manner. According to an embodiment, such a functional sleeve 82 consists of piezoelectric material which extends or contracts in radial direction of the functional sleeve 82 upon application of an electrical voltage. In the same way, technical solutions by means of hydraulic, electro-mechanic and/or electro-magnetic are preferred.

FIG. 6 shows a further embodiment for compensating mechanical tension conditions in the area of holding core 40a, insert 1 and plastic layer 10. While here mechanical tension conditions are created in the same way as it has been described above for example with respect to FIGS. 4 and 5, a reduction of the mechanical tension conditions preferably occurs in a different way. The shrinkage processes SV stressing the insert 1 and the plastic layer 10 preferably act transversely or obliquely to the longitudinal axis of the insert 1. For allowing the insert 1 and/or the plastic 10 to reduce the forces of the shrinkage processes SV indicated by the arrows in FIG. 6, at least one predetermined breaking point 18 is provided in the plastic layer 10. The at least one predetermined breaking point 18 is preferably arranged adjacently to the inner wall 52 of the casting mold GF in the plastic layer 10. It is orientated transversely to the longitudinal direction of the insert 1 so that in case of failure, a lateral displacement between holding core 40a and insert 1 and/or plastic layer 10 is facilitated. In the same way, it is preferred to arrange several predetermined breaking points distributed in longitudinal direction over the plastic layer 10 (not shown).

It is further preferred to use the material designs of the plastic layer 10 described with respect to FIGS. 4 to 6 and the constructive designs of the plastic layer 10 alone or in arbitrary combination for reducing mechanical tensions in the cast part 70. Thereby, deformations occurring in the plastic layer 10 are compensated and do not damage the insert 1.

Subsequently to the demolding of the cast part 70 from the mold cavity 50, furthermore the plastic insert 10 may be removed from the insert 1. It is further preferred to maintain the plastic insert 10 in the insert 1 for post-processing procedures of the cast part 50. In this way, the insert 1 is protected from contamination.

A further embodiment of the wire thread insert sealed to the outside as insert 1 is shown schematically in cross-section in FIG. 7. The wire thread insert is sealed in the same way by an inner plastic layer in the cavity 6 and by the collar 14 against the entering of molten material, i.e. liquid metal or plastic, as it has been described with respect to the embodiment according to FIG. 2. In difference to the embodiment according to FIG. 2, the wire thread insert according to FIG. 7 has been completely filled with plastic (step S, FIG. 23). Thereby, the wire thread insert is protected from the entering of molten material on its radial outer side and on the front sides.

Further, the introduced sealing plastic was formed to a holding core 40b. The holding core 40b extends in axial direction beyond the flange 8. It has a shape so that it can be fastened in or at the inner wall 52 of the mold cavity 50. According to an embodiment of the casting mold GF, the holding core 40b can be inserted in an opening 56 of the inner wall 52. The preferably conical shape of the holding core 40b provides a respective hold in the mold cavity 50, for example by a press-fit. This is shown in FIG. 8. The holding core 40b is preferably also shaped cylindrically and the respective mounting in the mold cavity 50 is adapted thereto. In the same functionality and design as the embodiment of FIG. 2, the wire thread insert with holding core 40b has a collar 14.

The holding core 40b comprises further a fit 42. The fit 42 serves as receptacle for a tool, i.e. as drive means, for removing the holding core 40b and the plastic sealing 10 from the wire thread insert subsequently to the molding (SVII) of the wire thread insert into the cast part.

For manufacturing the cast part, the holding core 40b is fastened with the wire thread insert in the opening 56 of the inner wall 52. As the wire thread insert abuts with its collar 14 the inner wall 52, preferably in the recess 54, it is sealed against the entering of molten material. Subsequently, molten material flows into the mold cavity 50 (SVII) and cures there. Prior to the demolding (SIX) of the cast part 70, preferably the at least one holding core 40 is removed from the insert 1 (SVIII). Thereafter, the demolding (SIX) of the cast part 70 occurs. After the demolding (SIX) of the cast part 70, the holding core 40b with plastic sealing 60 is removed from the wire thread insert by means of a tool (SX).

With respect to FIG. 7 it has already been described that the holding core 40b consists of plastic, preferably completely. This plastic is in its material design preferably constructed identically to the above-described embodiments of the FIGS. 4, 5 and 6. Accordingly, the holding core 40*b* according to FIG. 10 consists of a plastic with an approximately heat independent strength. The holding core 40*b* according to FIG. 11 is preferably constructed of a plastic having a heat dependent strength which decreases with increasing thermal load. FIG. 12 shows schematically a preferred holding core 40*b* of plastic having at least one predetermined breaking point 18. The at least one predetermined breaking point 18 is in the same way arranged and has the same functionality as the predetermined breaking point of FIG. 6.

According to a further embodiment which is shown by means of the different shaded areas in FIG. 9, the holding core 40*b* consists of a combination of at least two plastics K1, K2. These plastics K1, K2 may be chosen from the groups of the above-described plastics. It is also preferred to combine other plastics with each other. Accordingly, preferably in different mechanical and/or thermal and/or with respect to the thermal extension differently loaded portions, plastics are used which are adapted to these loads. The chosen plastics are combined within the holding core 40*b* so that a multi-component holding core and/or a holding core having multiple layers in axial or radial direction and/or a compound holding core 40*b* is present.

According to a further embodiment shown in FIGS. 13 and 14, the wire thread insert is screwed onto a holding core 40*c* with thread 44. The holding core 40*c* preferably consists of metal, wherein here also materials like temperature-resistant plastics or ceramics are usable. The holding core 40*c* comprises further a fit 42 with the same characteristics as they have been described above with respect to the embodiments of FIGS. 7 and 8. By screwing the wire thread insert onto the holding core 40*c*, the thread 44 closes possible intermediate spaces between adjacent windings 2.

Further, the holding core 40*c* blocks an entering of molten material at the front sides of the wire thread insert. For supporting this sealing function of the holding core 40*c* with thread 44, preferably the inner side of the wire thread and/or the thread 44 is coated with an additionally sealing plastic layer. With respect to the choice of the plastic, the already above explained plastic types are preferred.

For the sealing between the flange 8 and the inner wall 52 of the mold cavity 50 of the casting mold, an annular or disc-shaped sealing element 60 similar to the collar 14 is provided. The annular sealing element 60 preferably consists of a deformable or flexible material for compensating surface irregularities at the interface between the flange 8 of the wire thread insert and the inner wall 52, preferably the recess 54. The sealing element 60 is a loose element having a radial extension larger than or equal to the radial extension of the flange 8 or the front side of the wire thread insert without flange 8. The inner opening of the sealing element 60 is adapted to the diameter of the holding core 40*c* for avoiding here an entering of molten material.

According to an embodiment, the sealing element 60 and the collar 14 (loose or in connection with the inner plastic coating or filling) are formed two-dimensional or areal in radial direction so that they have a constant thickness in axial direction. Alternatively, it is preferred to form the collar 14 and the sealing element 60 areally adjacent to the inner wall 52 and conically adjacent to the wire thread insert 1 or the insert (conical portion 62). The conical course is such that the thickness of the collar 14 and the sealing element radially inwardly increases so that the collar 14 and the sealing element 60 are formed in cross-section like a funnel. Due to this, the conical portion of the collar 14 or the sealing element 60 extends at least partly into the wire thread insert 1 or is pressed into the insert in a sealing manner. These embodiments are exemplarily illustrated based on the sealing element 60 of FIG. 13. It is further preferred that a circumferential sealing lip 64 is attached to the conical portion 62 of the sealing element 60 or the collar 14 (not shown) in axial direction. This sealing lip 62 abuts additionally sealingly one of the shown holding cores 40 and realizes an additional sealing of the wire thread insert. In this context, a preferred embodiment of the holding core 40 is to provide an indentation at the holding core 40 in the area of the sealing lip 64 in which the conical portion 62 with sealing lip 62 ends.

For producing a cast part, first of all the wire thread insert is screwed onto the thread 44 of the holding core 40*c*. Thereafter, the sealing element 60 is plugged onto the holding core 40*c* or arranged in the preferred recess 54 of the inner wall 52 of the casting mold. Subsequently, the holding core 40*c* is fastened in the opening 56 of the casting mold so that the wire thread insert is sealed by means of the thread 44 and the sealing element 60. After filling of the casting mold with molten material, hardening of the molten material and demolding of the cast part, the holding core 40*c* is screwed out of the wire thread insert by means of the fit 42.

When using a holding core 40*c* of steel, this embodiment of the present disclosure provides a very good position accuracy of the wire thread insert in the casting mold, a high mechanical stability as well as a complete sealing of the wire thread insert with respect to its surrounding. These advantages make this concept especially interesting for applications in die casting as here high filling velocities of up to 100 m/s and high holding pressures of up to 2,000 bar are used in molten metal, preferably molten aluminum.

In FIGS. 17 and 18, an embodiment is shown, in which the holding core 40*d* has no thread 44. For positioning the wire thread insert 1 in the casting mold, the wire thread insert is plugged onto the holding core 40*d*, before or after it has been fastened in the opening 56 of the casting mold. For sealing the wire thread insert on the front side, the sealing element is arranged in the same way between the wire thread insert 1 and the inner wall 52 of the casting mold as it has been described with respect to FIGS. 13 and 14.

The holding core 40*d* is only intended for the positioning of the wire thread insert in the casting mold and does not realize any sealing. The sealing in the front-sided portion of the wire thread insert is achieved by the sealing element 60. This sealing element 60 prevents the entering of molten metal or molten plastic into the thread in the front-sided portion of the wire thread insert as well as the flowing round of the front side or the flange 8 of the wire thread insert.

After the casting process, the component with the molded wire thread insert is removed from the casting mold. The holding core 40*d* may be removed from the wire thread insert subsequently with a suitable tool.

In the described way, this embodiment has no sealing on the front side facing away from the flange of the wire thread insert and on the lateral portion of the wire thread insert. Therefore, it is preferably to be used at casting methods with lower pressures and casting velocities of the molten material. The specific filling or casting velocities depend on the cast part geometry, first cuts, the volume and the cast material. Method conditions are preferably casting velocities in a range<20 m/s and pressures below 400 bar, especially 0.1 to 10 bar.

The holding core 40*d* shown in FIGS. 17 and 18 may be realized as solid material and also as hollow material (tube-like). According to the disclosure, it is preferred that the holding core 40*d* consists of metal, plastic, ceramic or combinations of these materials. At such material combinations as holding core 40*d*, the mechanical stability of the holding core is realized by means of the metallic part of the holding core while a soft plastic surrounding the metallic part realizes the sealing of the wire thread insert to the outside. With respect to its strength, this plastic is preferably designed as it has been described for example with respect to FIGS. 4 and 5.

A further embodiment for sealing and positioning the wire thread insert within a casting mold for the usage in a metal casting or plastic injection molding method is shown in FIGS. 19 and 20. In FIG. 19, the wire thread insert is directly moved on a metallic holding core 40*e* which is fixedly mounted in the casting mold. For preventing the flowing round the wire thread insert and the flowing of molten metal or molten plastic into the threads of the wire thread insert, the sealing element 60 is arranged between the inner wall 52, especially the recess 54, of the mold cavity 50 and the flange 8 of the wire thread insert. To this end, the sealing element 60 preferably consists of silicone having a preferred shore hardness of 10 of higher, preferably between 15 and 90. The sealing element is moved on the holding core 40*e* prior to the plugging of the wire thread insert onto the holding core 40*e*. According to a further alternative, it is preferred to place the sealing element 60 on the flange 8 of the wire thread insert and to move the wire thread insert together with the sealing element 60 onto the holding core 40*e*. This second method alternative is shown schematically in FIG. 20.

Subsequently to the casting process and the removal of the component, the sealing element 60 is removed from the cast part so that the wire thread insert is exposed. This embodiment has in the described way no sealing to the front side of the wire thread insert facing away from the flange and to the lateral area of the wire thread insert. Thus, it is suitable for casting methods with low pressures and low casting or filling velocities, the method conditions of which have been given above.

With respect to this embodiment, it is also preferred to apply a sealing plastic layer on the inner side of the wire thread insert as it has been described with respect to the embodiment of FIGS. 17 and 18.

The sealing elements 60 described in different preferred embodiments with the preferred shore hardness of 10 or higher, preferably between 15 and 90, are preferably realized as pre-fabricated flat, ring or molded seals. It is also preferred to apply the sealing element 60 directly as liquid sealing material onto the portion of the wire thread insert to be sealed. This is for example realizable with silicone in silicone casting methods.

It is also preferred to keep the plastic layer in the interior of the wire thread insert which seals the wire thread insert and to use it later as screw protection for thread elements screwed into the wire thread insert.

In further embodiments, the holding core 40 with a thread 44 is releasable from the casting mold GF with opening 56 prior to the demolding of the cast part 70 from the mold cavity 50. For this purpose, the holding core 40*c* can be screwed out of the casting mold GF as it is schematically indicated in FIG. 16*a*.

Prior to the beginning of the casting method, preferably the holding core 40*c* according to FIG. 14 is plugged into the opening 56. From this, it can be screwed out after the entering of molten material into the mold cavity 50 just before the cast part 70 has been demolded. It is also preferred to install the holding core 40*c* first of all fixed in the casting mold as it is shown in FIG. 15. Next, preferably the insert 1 is screwed onto this holding core 40*c*. Subsequently to the casting process and before the demolding of the cast part 70, the holding core 40*c* is screwed out of the insert 1 and the mold cavity 50 as it is shown in FIG. 16*a*.

In the same way, preferably the holding core 40*d* without thread 44 according to FIGS. 17 to 20 is removable from the insert 1 before the cast part 70 is demolded from the mold cavity. According to an embodiment, the holding core 40*e* is for this reason extracted from or pulled out of the insert 1.

According to the courses of procedure shown in FIGS. 16 and 21, first of all the insert 1 is positioned on the holding core 40; 40*e*. After filling of the mold cavity 50 with molten material of high velocity and at high holding pressure, a sudden solidification of the molten material starts at the inner wall 52 of the mold cavity 50. Further, shrinkage processes SV take place with the cooling of the molten material.

Preferably, after the solidification of the molten material and prior to the demolding of the cast component 70 from the mold cavity 50, the holding core 40*c*; 40*e* is removed from the respective insert 1. This takes place according to an embodiment with mechanical, electro-motoric and/or hydraulic aids. By removing the holding core 40*c*; 40*e*, the insert 1 can follow the shrinkage processes in the cast component 70 without that critical mechanical tensions are created by the holding of the insert 1 by means of the holding core 40*c*; 40*e*. Further, the subsequent demolding of the cast part 70 is facilitated. Because namely the holding core 40; 40*e* has already been removed from the mold cavity 50, the demolding of the cast part 70 can take place without considering the orientation of the holding core 40*c*; 40*e* in the mold cavity 50 with respect to the demolding direction.

The above described embodiments have several advantages which shall be summarized in the following. At the cutting processing of inner threads in metal cast parts, a blind hole surplus additionally to the usable thread depth is required for creating the thread blind holes due to the thread bore cutting and as chip receiving space. By using the present disclosure, it is possible to spare this blind hole surplus and to produce the required utility thread depth directly in the metal cast part. Further, it was shown that the production of cast parts according to the present disclosure is far more cost-effective as the cutting of a thread into a cast-part after the casting process. It is also advantageous to use the sealing plastic coating within the wire thread insert. This plastic coating also protects the thread with respect to contamination/damages which may occur for example after the demolding of the cast part and at the later processing of the cast part.

Further, it was found that the molding of the wire thread insert into a cast component is faster than a mechanical processing of the cast part after the casting process. Therefore, based on the present disclosure, the cycle times for producing a cast part with thread could be reduced. It is also stressed that the molded wire thread insert has a higher strength than threads applied by drilling and cutting in a cast part. This has at the same time the consequence that a screw diameter for such thread bores can be reduced due to the increased loadability of the thread. Further, with the present disclosure it is possible to reduce the space required for a thread bore or for an insert fastened in a cast part.

Due to the higher resistance of the threaded insert compared to aluminum, components of this type can also be used at connections which often have to be released. It is further preferred to protect the interior of the insert, especially of the wire thread insert, during the further processing of the cast part by a plastic insert. It is further expected that large thread surfaces of molded wire thread inserts have clearly increased extraction forces compared to known self-cutting wire thread inserts with flat threads.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. A metal casting method by which at least one insert is fastenable in a cast part, and which comprises the following steps:
 a. providing a casting mold having a mold cavity,
 b. providing at least one insert,
 c. positioning the at least one insert within the mold cavity with a positioning device,
 d. arranging a sealing element between the at least one insert and an inner wall of the mold cavity by which the at least one insert is at least partly sealable against an entering of molten metal,
 e. casting molten metal into the mold cavity and
 f. demolding the cast part, in which the positioning device consists of a holding core which is fastened releasably in an opening of the inner wall of the mold cavity, wherein the holding core is made of metal, plastic or ceramic, and the method comprises the further step of
  g1. fastening the holding core with the at least one insert being plugged on or screwed on the holding core with a one-sided front-end circumferential collar as the sealing element in the mold cavity, or
  g2. fastening the holding core with the at least one insert being plugged on or screwed on the holding core in the mold cavity, wherein a separate sealing element is arranged between the at least one insert and the inner wall of the mold cavity.

2. The casting method according to claim 1, in which the at least one insert comprises the following features:
 an at least partly open outer wall and an inner cavity,
 an inner wall of the inner cavity being at least partly coated with plastic or the inner cavity being at least partly provided with plastic so that
 the inner cavity is sealed against an entering of molten metal from the exterior.

3. The casting method according to claim 2, in which the at least one insert has on the face on one side a plastic collar which forms in operative connection with the wall of the casting mold a sealing element against molten metal.

4. The casting method according to claim 2, in which the inner cavity of the at least one insert is completely filled with plastic, wherein the plastic protrudes in the shape of a pin and on one side beyond the insert at least one.

5. The casting method according to claim 2, in which the inner cavity of the at least one insert is formed at least partly conically by means of the plastic at least partly coating the inner wall of the inner cavity.

6. The casting method according to claim 2, in which the at least one insert is a wound wire thread insert.

7. The casting method according to claim 2, in which the at least one insert comprises a plastic sleeve which coats an interior of the at least one insert, wherein a plastic of the plastic sleeve has an approximately heat-independent strength or a heat-dependent strength which decreases with increasing thermal load.

8. The casting method according to claim 2, in which the at least one insert comprises a plastic sleeve which coats an interior of the at least one insert, wherein the plastic sleeve has at least one predetermined breaking point ensuring a failure of the plastic sleeve transversely to a longitudinal direction of the plastic sleeve.

9. The casting method according to claim 1, which is a pressure-supported metal casting method.

10. The casting method of claim 1 wherein a cast part of metal is formed with an integrated insert which has an inner cavity being at least partly free from hardened molten material and has at least one-sided on the face an entrance opening without hardened molten material.

11. A metal casting method by which at least one insert is fastenable in a cast part, and which comprises the following steps:
 a. providing a casting mold having a mold cavity,
 b. providing at least one insert,
 c. positioning the at least one insert within the mold cavity with a positioning device,
 d. arranging a sealing element between the at least one insert and an inner wall of the mold cavity by which the at least one insert is at least partly sealable against an entering of molten metal,
 e. casting molten metal into the mold cavity and
 f. demolding the cast part, in which the positioning device consists of a holding core which is fastened permanently at the inner wall of the mold cavity, wherein the holding core is made of metal, plastic or ceramic, and the method comprises the further step of
  g1. plugging or screwing the at least one insert with a one-sided front-end circumferential collar as the sealing element onto the holding core in the mold cavity or
  g2. plugging or screwing the at least one insert onto the holding core in the mold cavity wherein a separate sealing element is arranged between the at least one insert and the inner wall of the mold cavity.

12. The casting method according to claim 11, which is a pressure-supported metal casting method.

13. The casting method according to claim 11, in which the at least one insert comprises the following features:
 an at least partly open outer wall and an inner cavity,
 an inner wall of the inner cavity being at least partly coated with plastic or the inner cavity being at least partly provided with plastic so that
 the inner cavity is sealed against an entering of molten metal from the exterior.

14. The casting method according to claim 13, in which the at least one insert has on the face on one side a plastic collar which forms in operative connection with the wall of the casting mold a sealing element against molten metal.

15. The casting method according to claim 13, in which the inner cavity of the at least one insert is completely filled with plastic, wherein the plastic protrudes in the shape of a pin and on one side beyond the at least one insert.

16. The casting method according to claim 13, in which the inner cavity of the at least one insert is formed at least partly conically by the plastic at least partly coating the inner wall of the inner cavity.

17. The casting method according to claim 13, in which the at least one insert is a wound wire thread insert.

18. The casting method according to claim 13, in which the at least one insert comprises a plastic sleeve which coats an interior of the at least one insert, wherein a plastic of the plastic sleeve has an approximately heat-independent strength or a heat-dependent strength which decreases with increasing thermal load.

19. The casting method according to claim 13, in which the at least one insert comprises a plastic sleeve which coats an interior of the at least one insert, wherein the plastic sleeve has at least one predetermined breaking point ensuring a failure of the plastic sleeve transversely to a longitudinal direction of the plastic sleeve.

20. The casting method of claim 11 wherein a cast part of metal is formed with an integrated insert which has an inner cavity being at least partly free from hardened molten material and has at least one-sided on the face an entrance opening without hardened molten material.

21. A metal casting method by which at least one insert is fastenable in a cast part, and which comprises the following steps:
   a. providing a casting mold having a mold cavity,
   b. providing at least one insert,
   c. positioning the at least one insert within the mold cavity with a positioning device,
   d. arranging a sealing element between the at least one insert and an inner wall of the mold cavity by which the at least one insert is at least partly sealable against an entering of molten metal,
   e. casting molten metal into the mold cavity and
   f. demolding the cast part, in which the positioning device consists of a holding core which is arranged movably in the inner wall of the mold cavity, wherein the holding core is made of metal, plastic or ceramic, and the method comprises the further step of
      g1. plugging the at least one insert onto the holding core without thread in the mold cavity or screwing the at least one insert onto the holding core with thread in the mold cavity, wherein the at least one insert comprises a one-sided front-end circumferential collar as the sealing element, or
      g2. plugging the at least one insert onto the holding core without thread in the mold cavity or screwing the at least one insert onto the holding core with thread in the mold cavity, wherein a separate sealing element is arranged between the at least one insert and the inner wall of the mold cavity.

22. The casting method according to claim 21, comprising the further step of:
   removing the holding core with or without thread from the at least one insert after casting of the mold cavity and prior to the demolding of the cast part from the mold cavity.

23. The casting method according to claim 22, in which for demolding, at least two mold halves of the mold cavity are moved irrespective of an orientation of the holding core.

24. The casting method according to claim 21, which is a pressure-supported metal casting method.

25. The casting method according to claim 21, in which the at least one insert comprises the following features:
   an at least partly open outer wall and an inner cavity,
   an inner wall of the inner cavity being at least partly coated with plastic or the inner cavity being at least partly provided with plastic so that
   the inner cavity is sealed against an entering of molten metal from the exterior.

26. The casting method according to 25, in which the at least one insert has on the face on one side a plastic collar which forms in operative connection with the wall of the casting mold a sealing element against molten metal.

27. The casting method according to 25, in which the inner cavity of the at least one insert is completely filled with plastic, wherein the plastic protrudes in the shape of a pin and on one side beyond the at least one insert.

28. The casting method according to 25, in which the inner cavity of the at least one insert is formed at least partly conically by the plastic at least partly coating the inner wall of the inner cavity.

29. The casting method according to 25, in which the at least one insert is a wound wire thread insert.

30. The casting method according to 25, in which the at least one insert comprises a plastic sleeve which coats an interior of the at least one insert, wherein a plastic of the plastic sleeve has an approximately heat-independent strength or a heat-dependent strength which decreases with increasing thermal load.

31. The casting method according to 25, in which the at least one insert comprises a plastic sleeve which coats an interior of the at least one insert, wherein the plastic sleeve has at least one predetermined breaking point ensuring a failure of the plastic sleeve transversely to a longitudinal direction of the plastic sleeve.

32. The casting method of claim 21 wherein a cast part of metal is formed with an integrated insert which has an inner cavity being at least partly free from hardened molten material and has at least one-sided on the face an entrance opening without hardened molten material.

* * * * *